US012743792B2

(12) United States Patent
Zhang et al.

(10) Patent No.: US 12,743,792 B2
(45) Date of Patent: Sep. 22, 2026

(54) SYSTEMS AND METHODS FOR IMAGE PROCESSING

(71) Applicant: SHANGHAI UNITED IMAGING HEALTHCARE CO., LTD., Shanghai (CN)

(72) Inventors: Zhongliang Zhang, Shanghai (CN); Guotao Quan, Shanghai (CN); Yuan Bao, Shanghai (CN); Jianwei Fu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 332 days.

(21) Appl. No.: 18/482,911

(22) Filed: Oct. 8, 2023

(65) Prior Publication Data

US 2024/0037762 A1 Feb. 1, 2024

Related U.S. Application Data

(63) Continuation of application No. PCT/CN2022/085949, filed on Apr. 8, 2022.

(30) Foreign Application Priority Data

Apr. 8, 2021 (CN) ......................... 202110377385.3

(51) Int. Cl.
*G06T 7/246* (2017.01)
*G06T 7/33* (2017.01)
*G06T 7/38* (2017.01)

(52) U.S. Cl.
CPC .............. *G06T 7/248* (2017.01); *G06T 7/337* (2017.01); *G06T 7/38* (2017.01); *G06T 2207/10016* (2013.01); *G06T 2207/20221* (2013.01)

(58) Field of Classification Search
CPC ........... G06T 7/248; G06T 7/337; G06T 7/38; G06T 2207/10016; G06T 2207/20221;
(Continued)

(56) References Cited

U.S. PATENT DOCUMENTS 11,049,230 B2 * 6/2021 Bai .......................... G06T 12/20
2011/0142318 A1 * 6/2011 Chen .................... G06V 10/446
382/131

(Continued)

FOREIGN PATENT DOCUMENTS

CN 104107063 A 10/2014
CN 108492340 A 9/2018

(Continued)

OTHER PUBLICATIONS

Wang, HE et al., Validation of an Accelerated 'demons' Algorithm for Deformable Image Registration in Radiation Therapy, Physics in Medicine and Biology, 50(12): 2887-2905, 2005.

(Continued)

*Primary Examiner* — Amara Abdi
(74) *Attorney, Agent, or Firm* — METIS IP LLC

(57) ABSTRACT

The present disclosure is related to systems and methods for image processing. The method includes obtaining, from a first image set of a subject acquired at a first time point, a first image; obtaining, from a second image set of the subject acquired at a second time point, a second image, wherein the first image and the second image correspond to a same region of the subject; determining a displacement vector field based on the first image and the second image; and generating a target image based on the displacement vector field, the first image set and the second image set.

17 Claims, 10 Drawing Sheets

(58) Field of Classification Search
CPC ... G06T 5/50; G06T 7/37; G06T 2207/10081; G06T 2207/10104; G06T 2207/10116; G06T 2207/30016; G06T 2207/30096; G06T 2207/30101; G06T 11/005; G16H 30/20; G16H 40/67; G16H 30/40
See application file for complete search history.

(56) References Cited

U.S. PATENT DOCUMENTS

| | | | | |
|---|---|---|---|---|
| 2012/0059239 | A1* | 3/2012 | Yamaguchi | A61B 6/5241 600/407 |
| 2014/0161338 | A1* | 6/2014 | Machado | G06T 7/344 382/131 |
| 2019/0130554 | A1* | 5/2019 | Rothberg | G06T 7/0002 |
| 2019/0392615 | A1 | 12/2019 | Zabic | |
| 2020/0297301 | A1* | 9/2020 | Sato | A61B 6/461 |
| 2021/0150456 | A1* | 5/2021 | Cho | G06K 7/1413 |
| 2022/0122247 | A1* | 4/2022 | Koehler | G06T 7/38 |
| 2022/0156904 | A1* | 5/2022 | Manhart | A61B 5/0033 |
| 2023/0082641 | A1 | 3/2023 | Yu | |

FOREIGN PATENT DOCUMENTS

| | | | |
|---|---|---|---|
| CN | 109171793 | A | 1/2019 |
| CN | 109325971 | A | 2/2019 |
| CN | 109978784 | A | 7/2019 |
| CN | 110569927 | A | 12/2019 |
| CN | 110619944 | A | 12/2019 |
| CN | 112215877 | A | 1/2021 |
| WO | 2012155136 | A2 | 11/2012 |
| WO | 2022214093 | A1 | 10/2022 |

OTHER PUBLICATIONS

International Search Report in PCT/CN2022/085949 mailed on Jun. 27, 2022, 4 pages.

Written Opinion in PCT/CN2022/085949 mailed on Jun. 27, 2022, 6 pages.

* cited by examiner

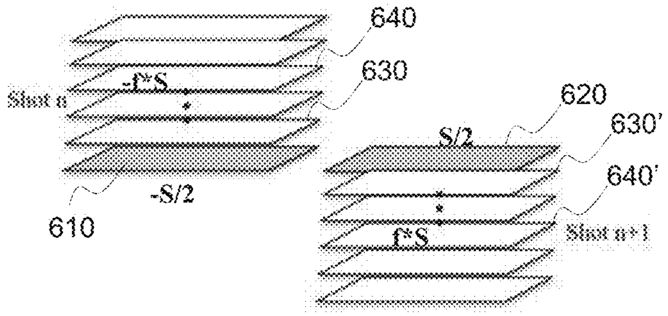

Obtaining a target image sequence based on at least one of the processed first image set or the processed second image set — 1110

↓

Generating the target image based on the target image sequence — 1120

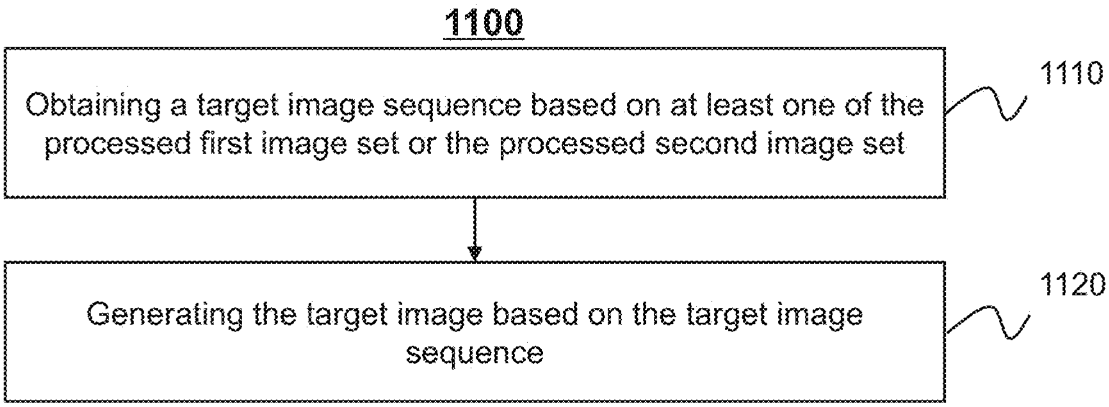

Obtaining an initial image sequence including the processed first image set and the second image set — 1210

↓ identifying a processed third image from the processed first image set — 1220

↓

Identifying a fourth image from the second image set, wherein the processed third image and the fourth image correspond to a same second region of the subject — 1230

↓

Determining the target image sequence based on at least one of the processed third image or the fourth image — 1230

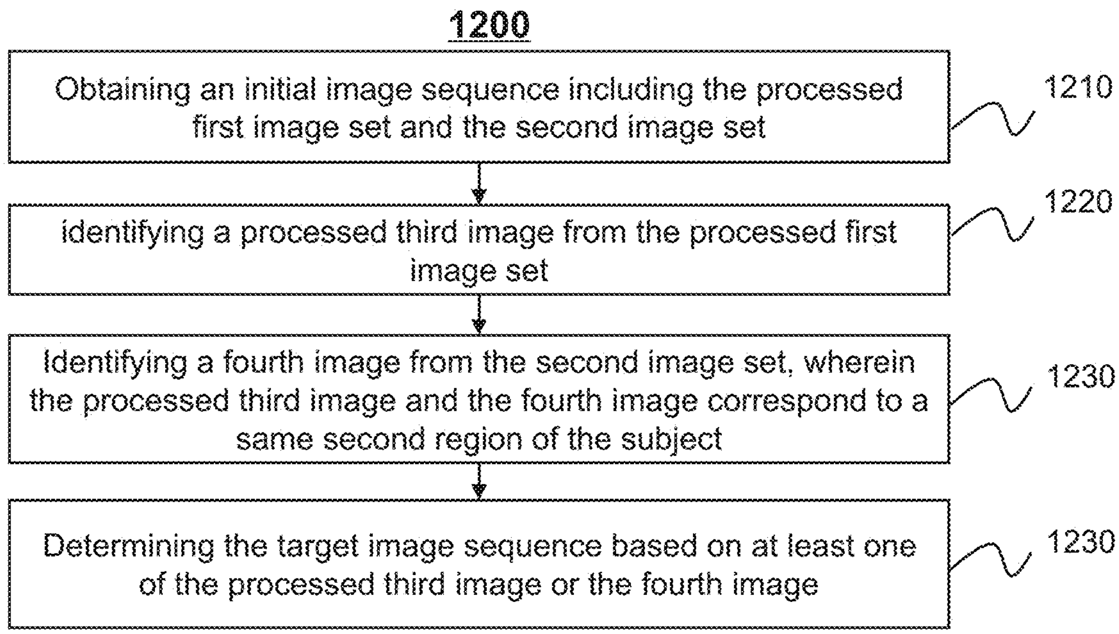

FIG. 12

SYSTEMS AND METHODS FOR IMAGE PROCESSING

CROSS-REFERENCE TO RELATED APPLICATIONS

This application is a continuation of International Application No. PCT/CN2022/085949, filed on Apr. 8, 2022, which claims priority of Chinese Patent Application No. 202110377385.3, filed on Apr. 8, 2021, the contents of each of which are hereby incorporated by reference.

TECHNICAL FIELD

This disclosure generally relates to systems and methods for image processing, and more particularly, relates to systems and methods for image registration.

BACKGROUND

Computerized axial tomography (CAT) is widely used in clinical diagnosis and/or treatment. During a CAT scan using a CAT device, a plurality of image sets, each including a representation of at least a portion of an object, are obtained along the movement of a bed of the CAT device that carries the object. Each of the plurality of image sets is obtained at a time point, e.g., when the bed moves to a bed position. A CT image may be generated based on the plurality of image sets. However, since two image sets obtained at two different bed positions (e.g., at two adjacent bed positions) or at two different time points (e.g., two adjacent time points) may include images, or a portion thereof, corresponding to a same region of the subject, some structures (e.g., bones, coronary arteries, blood vessels, etc.) are often staggered in the CT image. Thus, it is desirable to develop methods and systems for image processing to effectively solve such problems.

SUMMARY

According to an aspect of the present disclosure, a system for image processing is provided. The system may include at least one storage device including a set of instructions; and at least one processor in communication with the at least one storage device, wherein when executing the set of instructions. The at least one processor may be directed to cause the system to perform operations including: obtaining, from a first image set of a subject acquired at a first time point, a first image; obtaining, from a second image set of the subject acquired at a second time point, a second image, wherein the first image and the second image correspond to a same region of the subject; determining a displacement vector field based on the first image and the second image; and generating a target image based on the displacement vector field, the first image set and the second image set.

In some embodiments, the determining a displacement vector field may include: registering the first image and the second image to obtain the displacement vector field.

In some embodiments, the generating a target image based on the displacement vector field, the first image set and the second image set may include: obtaining at least one of a processed first image set or a processed second image set based on the displacement vector field; and generating the target image based on at least one of the processed first image set or the processed second image set.

In some embodiments, the obtaining at least one of a processed first image set or a processed second image set based on the displacement vector field may include: processing the first image based on the displacement vector field to obtain a processed first image; and obtaining the processed first image set based on the processed first image.

In some embodiments, the obtaining the processed first image set based on the processed first image may include: identifying, from the first image set, a first remaining image that is different from the first image; determining a processed first remaining image based on the displacement vector field and a first weighting factor; and obtaining the processed first image set based on the processed first image and the processed first remaining image.

In some embodiments, the first weighting factor may be associated with a distance between the first image and the first remaining image.

In some embodiments, the generating the target image based on at least one of the processed first image set or the processed second image set may include: obtaining a target image sequence based on at least one of the processed first image set or the processed second image set; and generating the target image based on the target image sequence.

In some embodiments, the obtaining a target image sequence based on at least one of the processed first image set or the processed second image set may include: obtaining an initial image sequence including the processed first image set and the second image set; identifying a third image from the processed first image set; identifying a fourth image from the second image set, wherein the third image and the fourth image correspond to a same second region of the subject; and determining the target image sequence based on at least one of the third image or the fourth image.

In some embodiments, the determining the target image sequence based on at least one of the third image or the fourth image may include: deleting the fourth image from the initial image sequence to obtain the target image sequence.

In some embodiments, the determining the target image sequence based on at least one of the third image or the fourth image may include: determining a fused image based on the third image and the fourth image; and obtaining the target image sequence based on the processed first image set, the second image set, and the fused image.

In some embodiments, the determining a fused image based on the third image and the fourth image may include: assigning a first fusion weighting factor for the third image; assigning a second fusion weighting factor for the fourth image; and determining the fused image based on the third image, the first fusion weighting factor, the fourth image, and the second fusion weighting factor.

In some embodiments, the first fusion weighting factor may be associated with an image quality of the third image, and the second fusion weighting factor i may be associated with an image quality of the fourth image.

In some embodiments, the obtaining a target image sequence based on at least one of the processed first image set or the processed second image set may include: obtaining an initial image sequence including the processed first image set and the processed second image set; identifying a fifth image from the processed first image set; identifying a sixth image from the processed second image set, wherein the fifth image and the sixth image correspond to a same third region of the subject; and determining the target image sequence based on at least one of the fifth image or the sixth image.

In some embodiments, the determining the target image sequence based on at least one of the fifth image or the sixth image may include: deleting the fifth image or the sixth image from the initial image sequence to obtain the target image sequence.

In some embodiments, the determining the target image sequence based on at least one of the fifth image or the sixth image may include: determining a fused image based on the fifth image and the sixth image; and obtaining the target image sequence based on the processed first image set, the processed second image set, and the fused image.

In some embodiments, the determining a fused image based on the fifth image and the sixth image may include: assigning a third fusion weighting factor for the fifth image; assigning a fourth fusion weighting factor for the sixth image; and determining the fused image based on the fifth image, the third fusion weighting factor, the sixth image, and the fourth fusion weighting factor.

In some embodiments, the third fusion weighting factor may be associated with an image quality of the fifth image, and the fourth fusion weighting factor may be associated with an image quality of the sixth image.

In some embodiments, the first image set and the second image set may be obtained according to an image reconstruction algorithm.

In some embodiments, the first time point may immediately precede the second time point.

In some embodiments, the subject may be at a first bed position at the first time point, and the subject may be at a second bed position at the second time point.

In some embodiments, the first bed position may be immediately followed by the second bed position.

According to another aspect of the present disclosure, a method for image processing may include obtaining, from a first image set of a subject acquired at a first time point, a first image; obtaining, from a second image set of the subject acquired at a second time point, a second image, wherein the first image and the second image correspond to a same region of the subject; determining a displacement vector field based on the first image and the second image; and generating a target image based on the displacement vector field, the first image set and the second image set.

According to still another aspect of the present disclosure, a non-transitory computer readable medium may include at least one set of instructions. When executed by at least one processor of a computing device, the at least one set of instructions may cause the at least one processor to effectuate a method. The method may include obtaining, from a first image set of a subject acquired at a first time point, a first image; obtaining, from a second image set of the subject acquired at a second time point, a second image, wherein the first image and the second image correspond to a same region of the subject; determining a displacement vector field based on the first image and the second image; and generating a target image based on the displacement vector field, the first image set and the second image set.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 10 is a schematic diagram illustrating an exemplary first image set and an exemplary second image set according to some embodiments of the present disclosure;

FIG. 11 is a flowchart illustrating an exemplary process for generating a target image according to some embodiments of the present disclosure;

FIG. 12 is a flowchart illustrating an exemplary process for determining a target image sequence according to some embodiments of the present disclosure;

DETAILED DESCRIPTION

Figure 1:
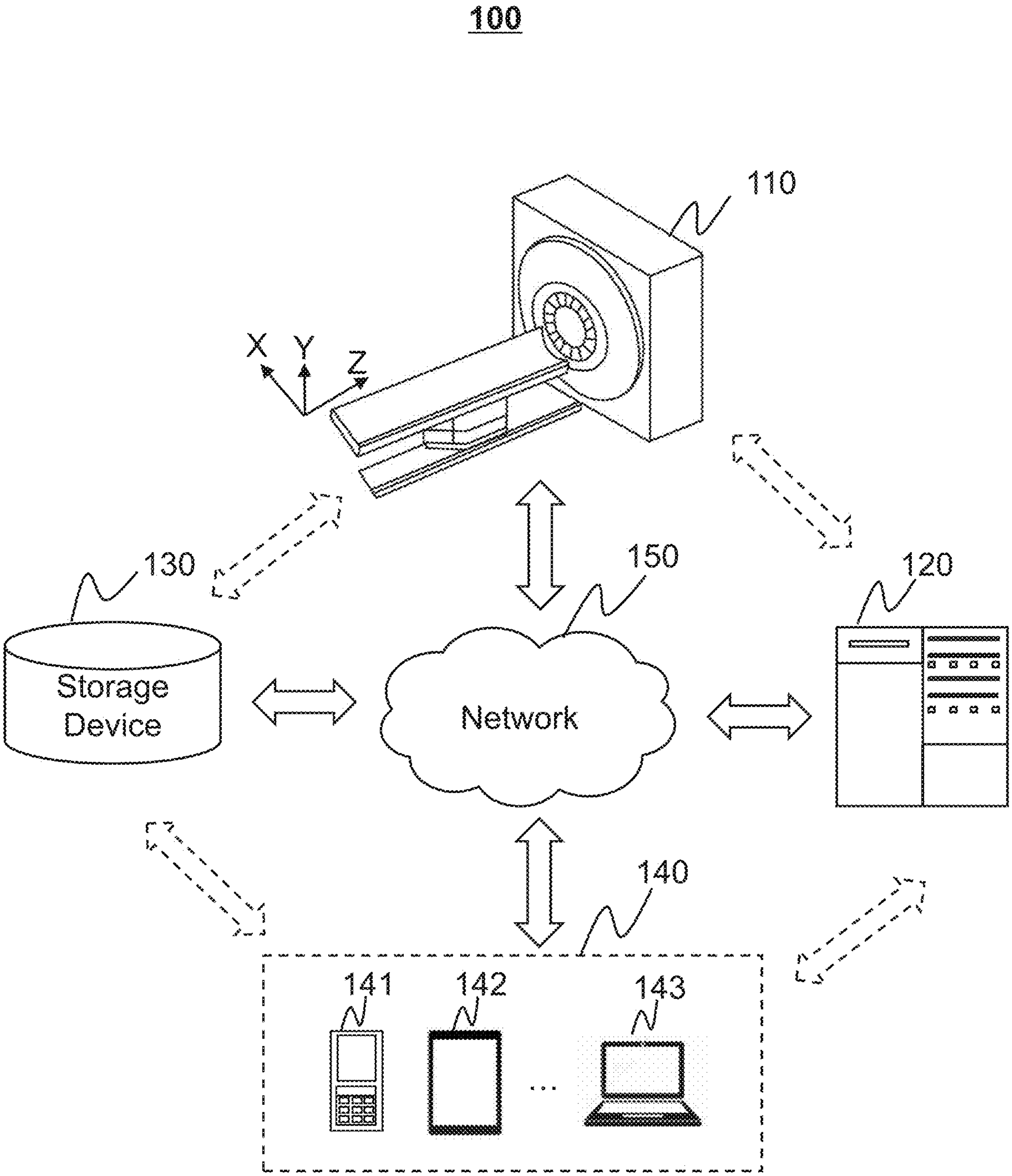
FIG. 1 is a schematic diagram illustrating an exemplary image processing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Also, the term "exemplary" is intended to refer to an example or illustration.

It will be understood that the terms "system," "engine," "unit," "module," and/or "block" used herein are one method to distinguish different components, elements, parts, sections or assembly of different levels in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that, although the terms "first," "second," "third," etc., may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

Spatial and functional relationships between elements are described using various terms, including "connected," "attached," and "mounted." Unless explicitly described as being "direct," when a relationship between first and second elements is described in the present disclosure, that relationship includes a direct relationship where no other intervening elements are present between the first and second elements, and also an indirect relationship where one or more intervening elements are present (either spatially or functionally) between the first and second elements. In contrast, when an element is referred to as being "directly" connected, attached, or positioned to another element, there are no intervening elements present. Other words used to describe the relationship between elements should be interpreted in a like fashion (e.g., "between," versus "directly between," "adjacent," versus "directly adjacent," etc.).

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The term "image" in the present disclosure is used to collectively refer to image data (e.g., scan data, projection data) and/or images of various forms, including a two-dimensional (2D) image, a three-dimensional (3D) image, a four-dimensional (4D), etc. The term "pixel" and "voxel" in the present disclosure are used interchangeably to refer to an element of an image. The term "anatomical structure" in the present disclosure may refer to gas (e.g., air), liquid (e.g., water), solid (e.g., stone) cell, tissue, organ of a subject, or any combination thereof, which may be displayed in an image and really exist in or on the subject's body. The term "region," "location," and "area" in the present disclosure may refer to a location of an anatomical structure shown in the image or an actual location of the anatomical structure existing in or on the subject's body, since the image may indicate the actual location of a certain anatomical structure existing in or on the subject's body. The term "an image of a subject" may be referred to as the subject for brevity.

For illustration purposes, the following description is provided to help better understanding an image registration process. It is understood that this is not intended to limit the scope of the present disclosure. For persons having ordinary skills in the art, a certain amount of variations, changes and/or modifications may be deducted under the guidance of the present disclosure. Those variations, changes and/or modifications do not depart from the scope of the present disclosure.

An aspect of the present disclosure relates to systems and methods for image processing. In some embodiments, the systems and methods may obtain a first image and a second image. The first image may be obtained from a first image set of a subject acquired at a first time point. The second image may be obtained from a second image set of the subject acquired at a second time point. In some embodiments, the first image and the second image may correspond to a same region of the subject. One or more factors including, e.g., a physiological motion and/or a rigid motion of the subject, a moving direction of a bed that carries the subject being not parallel to an axis of a gantry where an imaging source and/or a detector is installed, a deformation of the bed, etc., between the first time point and the second time point may be reflected in the first image and the second image that correspond to the same region of the subject, causing the first image and in the second image, or at least some corresponding pixels (or voxels) in the first image and in the second image, to misalign. As used herein, a first pixel (or voxel) in the first image of the subject corresponding to a second pixel (or voxel) in the second image of the subject indicates that the first pixel (or voxel) and the second pixel (or voxel) represent a same physical point of the subject or a same location of the ambient of the subject shown in the first or the second image. In some embodiments, the systems and methods may determine a displacement vector field based on the first image and the second image. The displacement vector field may include a plurality of displacement vectors, each of which may represent a displacement value of two corresponding pixels (or voxels) in the first image and the second image. In some embodiments, the systems and methods may generate a target image based on the displacement vector field, the first image set and the second image set. For example, the systems and methods may process the first image set and/or the second image set using the displacement vector field, and generate the target image based on a processed first image set and/or a processed second image set. Artifact (e.g., a stagger) in the target image caused by, e.g., the misalignment of the first image and the second image, may be improved, thereby improving the efficiency and/or accuracy of diagnosis and/or treatment performed based thereon.

FIG. 1 is a schematic diagram illustrating an exemplary image processing system according to some embodiments of the present disclosure. As shown, the image processing system 100 may include a medical device 110, a processing device 120, a storage device 130, one or more terminal(s) 140, and a network 150. In some embodiments, the medical device 110, the processing device 120, the storage device 130, and/or the terminal(s) 140 may be connected to and/or communicate with each other via a wireless connection (e.g., the network 150), a wired connection, or a combination thereof. The image processing system 100 may include various types of connections between its components. For example, the medical device 110 may be connected to the processing device 120 through the network 150, or connected to the processing device 120 directly as illustrated by the bidirectional dotted arrow connecting the medical device 110 and the processing device 120 in FIG. 1. As another example, the terminal(s) 140 may be connected to the processing device 120 through the network 150, or connected to the processing device 120 directly as illustrated by the bidirectional dotted arrow connecting the terminal(s) 140 and the processing device 120 in FIG. 1. As still another example, the storage device 130 may be connected to the medical device 110 through the network 150, or connected to the medical device 110 directly as illustrated by the bidirectional dotted arrow connecting the medical device 110 and the storage device 130 in FIG. 1. As still another example, the storage device 130 may be connected to the terminal(s) 140 through the network 150, or connected to the terminal(s) 140 directly as illustrated by the bidirectional dotted arrow connecting the terminal(s) 140 and the storage device 130 in FIG. 1.

The medical device 110 may be configured to acquire imaging data relating to a subject. The imaging data relating to a subject may include an image (e.g., an image slice), projection data, or a combination thereof. In some embodiments, the imaging data may be a two-dimensional (2D) imaging data, a three-dimensional (3D) imaging data, a four-dimensional (4D) imaging data, or the like, or any combination thereof. The subject may be biological or non-biological. For example, the subject may include a patient, a man-made object, etc. As another example, the subject may include a specific portion, an organ, and/or tissue of the patient. Specifically, the subject may include the head, the neck, the thorax, the heart, the stomach, a blood vessel, soft tissue, a tumor, or the like, or any combination thereof. In the present disclosure, “object” and “subject” are used interchangeably. For illustration purposes, a coordinate system as shown in FIG. 1 is introduced. The coordinate system may include an X-axis, a Y-axis, and a Z-axis. The Y-axis may refer to a direction perpendicular to a bed of the medical device 110. The Z-axis may refer to a long axis of the bed. The X-axis may refer to a short axis of the bed.

In some embodiments, the medical device 110 may include a single modality imaging device. For example, the medical device 110 may include a computed tomography (CT) device, a computerized axial tomography (CAT) device, an X-ray imaging device, or the like, or any combination thereof. In some embodiments, the medical device 110 may include a multi-modality imaging device. Exemplary multi-modality imaging devices may include a PET-CT device, a SPET-CT device, or the like, or any combination thereof. The multi-modality imaging device may perform multi-modality imaging simultaneously. For example, the PET-CT device may generate structural X-ray CT data and functional PET data simultaneously in a single scan.

In some embodiments, the medical device 110 may transmit the image(s) via the network 150 to the processing device 120, the storage device 130, and/or the terminal(s) 140. For example, the image(s) may be sent to the processing device 120 for further processing or may be stored in the storage device 130.

The processing device 120 may process data and/or information obtained from the medical device 110, the storage device 130, and/or the terminal(s) 140. For example, the processing device 120 may obtain, from a first image set of a subject acquired at a first time point, a first image and obtain, from a second image set of the subject acquired at a second time point, a second image. The first image and the second image may correspond to a same region of the subject. As another example, the processing device 120 may determine a displacement vector field based on the first image and the second image. As still another example, the processing device 120 may generate a target image based on the displacement vector field, the first image set and the second image set.

In some embodiments, the processing device 120 may be a single server or a server group. The server group may be centralized or distributed. In some embodiments, the processing device 120 may be local or remote. For example, the processing device 120 may access information and/or data from the medical device 110, the storage device 130, and/or the terminal(s) 140 via the network 150. As another example, the processing device 120 may be directly connected to the medical device 110, the terminal(s) 140, and/or the storage device 130 to access information and/or data. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 120 may be part of the terminal 140. In some embodiments, the processing device 120 may be part of the medical device 110.

The storage device 130 may store data, instructions, and/or any other information. In some embodiments, the storage device 130 may store data obtained from the medical device 110, the processing device 120, and/or the terminal(s) 140. The data may include image data acquired by the processing device 120, algorithms and/or models for processing the image data, etc. For example, the storage device 130 may store image sets of a subject obtained from a medical device (e.g., the medical device 110). As another example, the storage device 130 may store a target image of the image sets determined by the processing device 120. In some embodiments, the storage device 130 may store data and/or instructions that the processing device 120, and/or the terminal 140 may execute or use to perform exemplary methods described in the present disclosure. In some embodiments, the storage device 130 may include a mass storage, removable storage, a volatile read-and-write memory, a read-only memory (ROM), or the like, or any combination thereof. Exemplary mass storages may include a magnetic disk, an optical disk, a solid-state drive, etc. Exemplary removable storages may include a flash drive, a floppy disk, an optical disk, a memory card, a zip disk, a magnetic tape, etc. Exemplary volatile read-and-write memories may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components in the image processing system 100 (e.g., the processing device 120, the terminal(s) 140). One or more components in the image processing system 100 may access the data or instructions stored in the storage device 130 via the network 150. In some embodiments, the storage device 130 may be integrated into the medical device 110 or the terminal(s) 140.

The terminal(s) 140 may be connected to and/or communicate with the medical device 110, the processing device 120, and/or the storage device 130. In some embodiments, the terminal 140 may include a mobile device 141, a tablet computer 142, a laptop computer 143, or the like, or any combination thereof. For example, the mobile device 141 may include a mobile phone, a personal digital assistant (PDA), a gaming device, a navigation device, a point of sale (POS) device, a laptop, a tablet computer, a desktop, or the like, or any combination thereof. In some embodiments, the terminal 140 may include an input device, an output device, etc. The input device may include alphanumeric and other keys that may be input via a keyboard, a touchscreen (for example, with haptics or tactile feedback), a speech input, an eye tracking input, a brain monitoring system, or any other comparable input mechanism. Other types of the input device may include a cursor control device, such as a mouse, a trackball, or cursor direction keys, etc. The output device may include a display, a printer, or the like, or any combination thereof.

The network 150 may include any suitable network that can facilitate the exchange of information and/or data for the image processing system 100. In some embodiments, one or more components of the image processing system 100 (e.g., the medical device 110, the processing device 120, the storage device 130, the terminal(s) 140, etc.) may communicate information and/or data with one or more other components of the image processing system 100 via the network 150. For example, the processing device 120 and/or the terminal 140 may obtain image data from the medical device 110 via the network 150. As another example, the processing device 120 and/or the terminal 140 may obtain information stored in the storage device 130, or a storage device external to the image processing system 100, via the network 150. The network 150 may be and/or include a public network (e.g., the Internet), a private network (e.g., a local area network (LAN), a wide area network (WAN), etc.), a wired network (e.g., an Ethernet network), a wireless network (e.g., a Wi-Fi network), a cellular network (e.g., a Long Term Evolution (LTE) network), a frame relay network, a virtual private network (VPN), a satellite network, a telephone network, routers, hubs, witches, server computers, and/or any combination thereof. For example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the image processing system 100 may be connected to the network 150 to exchange data and/or information.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. In some embodiments, the image processing system 100 may include one or more additional components and/or one or more components of the image processing system 100 described above may be omitted. Additionally or alternatively, two or more components of the image processing system 100 may be integrated into a single component. A component of the image processing system 100 may be implemented on two or more sub-components.

Figure 2:
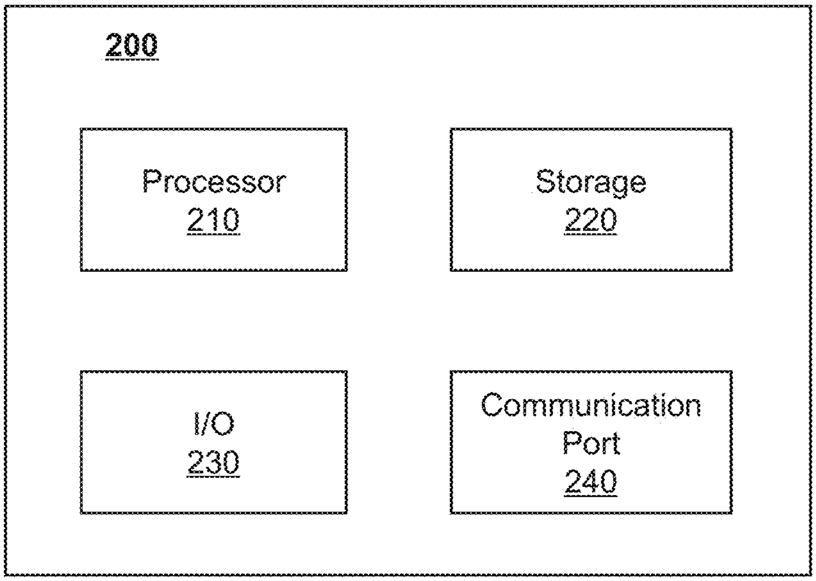
FIG. 2 is a schematic diagram illustrating exemplary hardware and/or software components of an exemplary computing device on which a processing device may be implemented according to some embodiments of the present disclosure.

FIG. 2 is a schematic diagram illustrating exemplary hardware and/or software components of an exemplary computing device on which the processing device 120 may be implemented according to some embodiments of the present disclosure. As illustrated in FIG. 2, a computing device 200 may include a processor 210, a storage 220, an input/output (I/O) 230, and a communication port 240.

The processor 210 may execute computer instructions (e.g., program code) and perform functions of the processing device 120 in accordance with techniques described herein. The computer instructions may include, for example, routines, programs, objects, components, data structures, procedures, modules, and functions, which perform particular functions described herein. For example, the processor 210 may process image data obtained from the medical device 110, the terminal(s) 140, the storage device 130, and/or any other component of the image processing system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combination thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage 220 may store data/information obtained from the medical device 110, the terminal(s) 140, the storage device 130, and/or any other component of the image processing system 100. The storage 220 may be similar to the storage device 130 described in connection with FIG. 1, and the detailed descriptions are not repeated here.

The I/O 230 may input and/or output signals, data, information, etc. In some embodiments, the I/O 230 may enable a user interaction with the processing device 120. In some embodiments, the I/O 230 may include an input device and an output device. Examples of the input device may include a keyboard, a mouse, a touchscreen, a microphone, a sound recording device, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touchscreen, or the like, or a combination thereof.

The communication port 240 may be connected to a network (e.g., the network 150) to facilitate data communications. The communication port 240 may establish connections between the processing device 120 and the medical device 110, the terminal(s) 140, and/or the storage device 130. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. In some embodiments, the communication port 240 may be and/or include a standardized communication port, such as RS232, RS485. In some embodiments, the communication port 240 may be a specially designed communication port. For example, the communication port 240 may be designed in accordance with the digital imaging and communications in medicine (DICOM) protocol.

Figure 3:
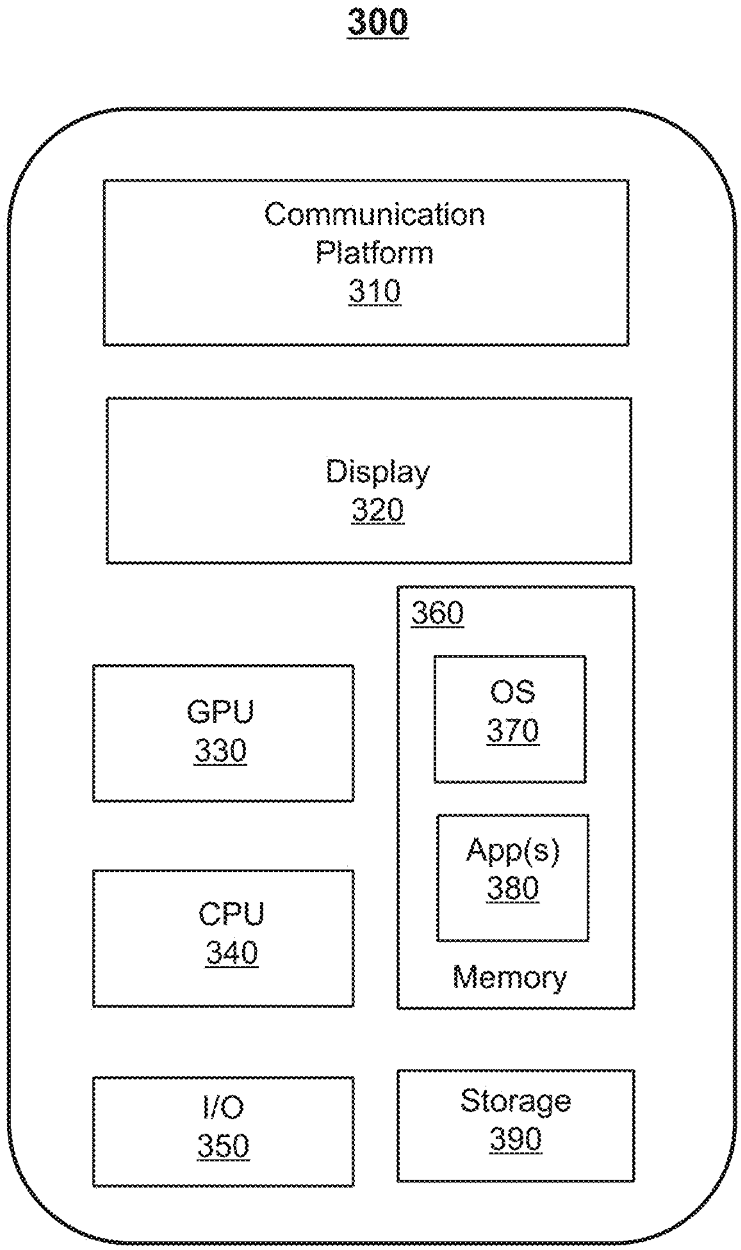
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the terminal(s) 140 and/or the processing device 120 may be implemented on a mobile device 300, respectively.

As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, the communication platform 310 may be configured to establish a connection between the mobile device 300 and other components of the image processing system 100, and enable data and/or signal to be transmitted between the mobile device 300 and other components of the image processing system 100. For example, the communication platform 310 may establish a wireless connection between the mobile device 300 and the medical device 110, and/or the processing device 120. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. The communication platform 310 may also enable the data and/or signal between the mobile device 300 and other components of the image processing system 100. For example, the communication platform 310 may transmit data and/or signals inputted by a user to other components of the image processing system 100. The inputted data and/or signals may include a user instruction. As another example, the communication platform 310 may receive data and/or signals transmitted from the processing device 120. The received data and/or signals may include imaging data acquired by the medical device 110.

In some embodiments, a mobile operating system (OS) 370 (e.g., iOS™, Android™ Windows Phone™, etc.) and one or more applications (App(s)) 380 may be loaded into the memory 360 from the storage 390 in order to be executed by the CPU 340. The applications 380 may include a browser or any other suitable mobile apps for receiving and rendering information from the processing device 120. User interactions with the information stream may be achieved via the I/O 350 and provided to the processing device 120 and/or other components of the image processing system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result the drawings should be self-explanatory.

Figure 4:
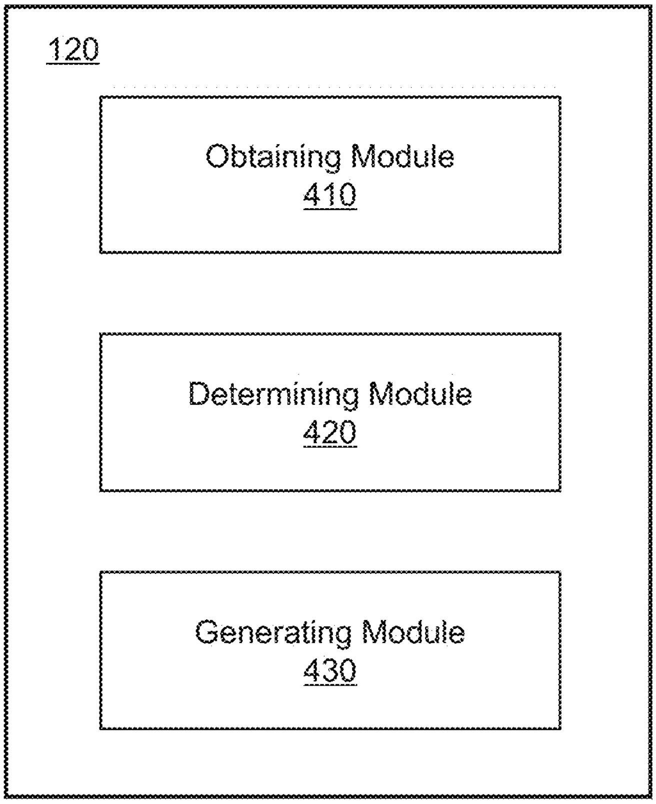
FIG. 4 is a block diagram illustrating an exemplary processing device according to some embodiments of the present disclosure.

FIG. 4 is a block diagram illustrating an exemplary processing device according to some embodiments of the present disclosure. In some embodiments, the processing device 120 may include an obtaining module 410, a determining module 420, and a generating module 430.

The obtaining module 410 may be configured to obtain data and/or information associated with the image processing system 100. In some embodiments, the obtaining module 410 may obtain, from a first image set of a subject acquired at a first time point, a first image. In some embodiments, the obtaining module 410 may obtain, from a second image set of the subject acquired at a second time point, a second image.

The determining module 420 may be configured to determine data and/or information associated with the image processing system 100. In some embodiments, the determining module 420 may determine a displacement vector field based on the first image and the second image. More descriptions regarding determining the displacement vector field may be found elsewhere in the present disclosure. See, e.g., FIG. 5 and the descriptions thereof.

The generating module 430 may be configured to generate a target image. Ins some embodiments, the generating module 430 may generate the target image based on the displacement vector field, the first image set and the second image set. More descriptions regarding generating the target image may be found elsewhere in the present disclosure. See, e.g., FIGS. 7-9, 11-13 and the descriptions thereof.

It should be noted that the above description of the processing device 120 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more modules may be added or omitted in the processing device 120. For example, the processing device 120 may further include a storage module (not shown in FIG. 4) configured to store data and/or information associated with the image processing system 100. In some embodiments, two or more modules may be integrated into a single module. For example, the determining module 420 and the generating module 430 may be integrated into a single module.

Figure 5:
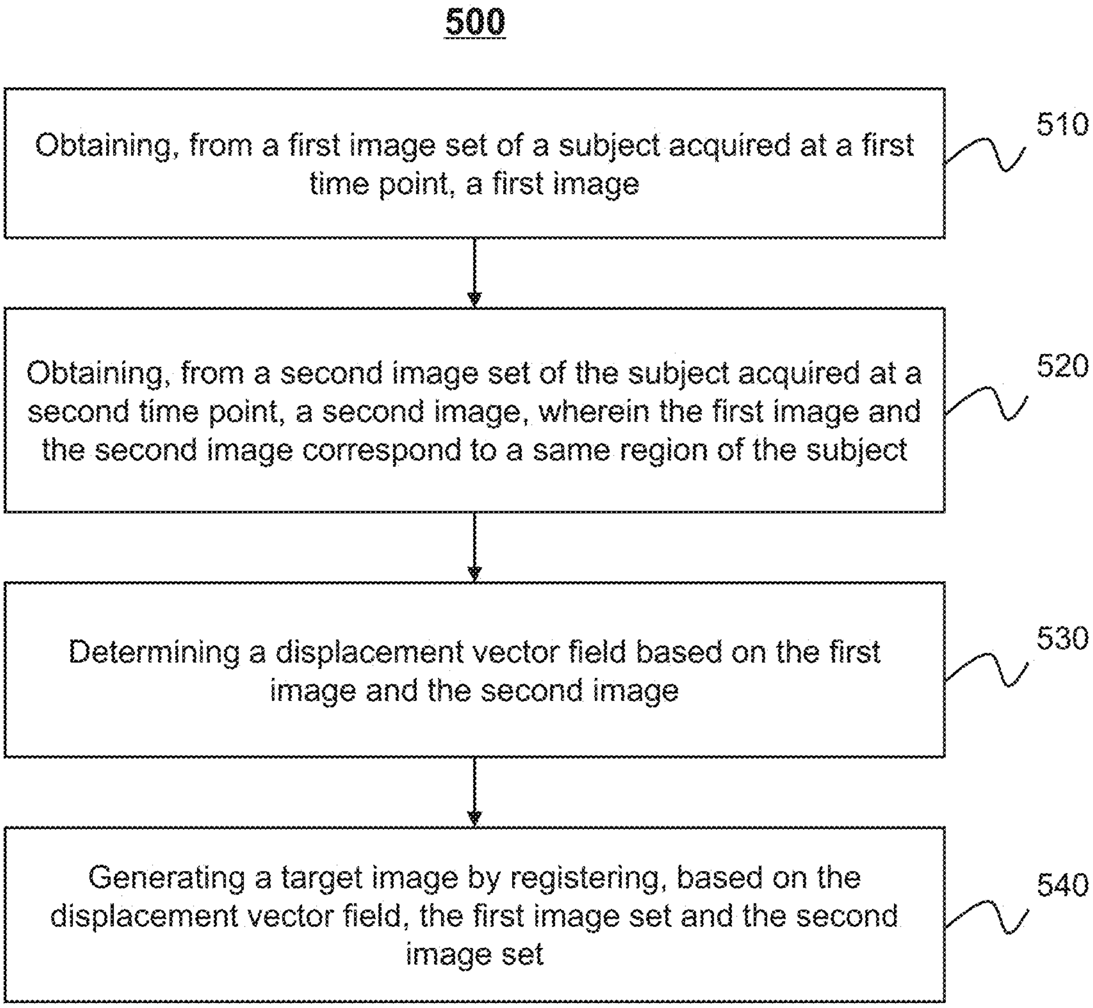
FIG. 5 is a flowchart illustrating an exemplary process for image processing according to some embodiments of the present disclosure.

FIG. 5 is a flowchart illustrating an exemplary process 500 for image processing according to some embodiments of the present disclosure. In some embodiments, the process 500 may be implemented in the image processing system 100 illustrated in FIG. 1. For example, the process 500 may be stored in the storage device 130 and/or the storage (e.g., the storage 220, the storage 390) as a form of instructions, and invoked and/or executed by the processing device 120 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, the processing device 120 (e.g., the obtaining module 410) may obtain, from a first image set of a subject acquired at a first time point, a first image.

In 520, the processing device 120 (e.g., the obtaining module 410) may obtain, from a second image set of the subject acquired at a second time point, a second image. In some embodiments, the first image and the second image may correspond to a same region of the subject.

In some embodiments, the first image set and the second image set may be obtained by scanning the subject using an imaging device (e.g., the medical device 110) at different time points and/or at different bed positions. As used herein, a time point refers to when the medical device 110 finishes scanning the subject at a bed position (or finishes obtaining an image set, e.g., the first image set, the second image set). For example, the subject may be at a first bed position at the first time point, and the subject may be at a second bed position at the second time point. The first time point may immediately precede the second time point, and the first bed position may be immediately followed by the second bed position. For example, the medical device 110 (e.g., a CAT device) may scan the subject when a bed of the medical device 110 is at the first bed position to obtain the first image set. As used herein, an image set includes at least one image, or image data from which the at least one image is generated by way of, e.g., image reconstruction. As used herein, the first time point refers to when the medical device 110 finishes scanning the subject at the first bed position (or finishes obtaining the first image set). The first bed position may be a position along a direction (e.g., z direction shown in FIG. 1) in which the bed moves into and out of a gantry of the medical device 110. After the first image set is obtained, the bed may move to the second bed position, and the medical device 110 may scan the subject to obtain the second image set. As used herein, the second time point refers to when the medical device 110 finishes scanning the subject at the second bed position (or finishes obtaining the second image set). As another example, the subject may be at a same bed position at the first time point and the second time point. For example, the medical device 110 may scan the subject when the bed of the medical device 110 is at a bed position to obtain the first image set at the first time point. After the first image set is obtained, the bed may remain at the same bed position, and the medical device 110 may scan the subject at the second time point to obtain the second image set. As still another example, a time difference between the first time point and the second time point may be a predetermined time difference (e.g., 1 s, 3 s, 5 s, 10 s, etc.). As a further example, a distance between the first bed position and the second bed position may be a predetermined distance (e.g., 3 cm, 5 cm, 10 cm, etc.).

Figure 6:
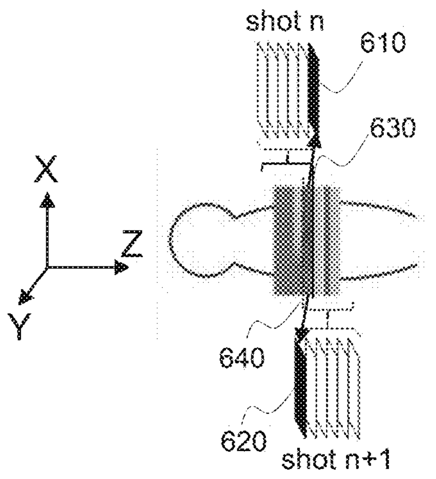
FIG. 6 is a schematic diagram illustrating an exemplary first image set and an exemplary second image set according to some embodiments of the present disclosure.

FIG. 6 is a schematic diagram illustrating an exemplary first image set and an exemplary second image set according to some embodiments of the present disclosure. As shown in FIG. 6, a first image set obtained in "shot n" including six images of a first region of a subject (a human body as exemplified in FIG. 6) may be obtained at the first time point (and/or at the first bed position), and a second image set obtained in "shot n+1" including six images of a second region of the subject may be obtained at the second time point (and/or at the second bed position), n is a positive integer. As illustrated in FIG. 6, the bed that carries the subject moves in the negative Z direction. In some embodiments, each of the plurality of images of the first image set (and/or the second image set) may correspond to a region of the subject. As shown in FIG. 6, a solid line 630 represents a boundary of the first region of subject represented in the first image set obtained in "shot n." A dotted line 640 represents a boundary of the second region of the subject represented in the second image set obtained in "shot n+1." Each of the images of the first image set obtained in "shot n" (and/or the second image set obtained in "shot n+1") may correspond to a slice in the first region (or the second region) of the subject. There may be an overlapping region between the first region and the second region. See, e.g., the region between the solid line 630 and the dotted line 640 in FIG. 6. In the overlapping region, there may be one or more slices of the subject each of which may be represented both in an image (e.g., the first image referred to elsewhere in the present disclosure) in the first image set and in an image (e.g., the second image referred to elsewhere in the present disclosure) in the second image set, respectively. In some embodiments, if the overlapping region of the subject includes only one slice of the subject represented in the first image set and also the second image set), a same slice of the subject between the solid line 630 and the dotted line 640 may correspond to a 2D image 610 of the first image set obtained in "shot n" and a 2D image 620 of the second image set obtained in "shot n+1," respectively. In some embodiments, if the overlapping region of the subject includes more than one same slice of the subject represented in the first image set (or the second image set), the overlapping region of the subject between the solid line 630 and the dotted line 640 may correspond to a 3D image 610 of the first image set obtained in "shot n" and a 3D image 620 of the second image set obtained in "shot n+1," respectively. The 3D image 610 may include a representation of the more than one same slices of the subject in the first image set by way of, e.g., image reconstruction. The 3D image 620 may include a representation of the more than one same slice of the subject in the second image set by way of, e.g., image reconstruction.

In some embodiments, each image may include location information indicating a location of each of various portions of the subject along the direction (e.g., Z direction) in which the bed moves into or out of the gantry of the medical device 110. In some embodiments, the location information may be represented as coordinates (e.g., pixel coordinates or voxel coordinates) in a coordinate system (e.g., the coordinate system XYZ shown in FIG. 1 or FIG. 6). In some embodiments, the coordinate system may be static, e.g., with reference to a position of the gantry (e.g., a point on the long axis of the gantry), dynamic, e.g., with reference to a position (e.g., an endpoint, a midpoint, etc.) of the bed, a position (e.g., a specific point of the subject supported on the bed (e.g., the top of the head of the subject, the bottom of one or both feet of the subject, etc.) or the like, or any combination thereof. In some embodiments, the location information may be determined based on a patient orientation (e.g., the head of the subject entering into the gantry of the medical device 110 first, the feet of the subject entering into the gantry of the medical device 110 first, etc.), a patient position (e.g., prone, supine, etc.), the bed position when the image is obtained, the position of each of one or more portions of the subject on the bed (assessed based on, e.g., the position of a specific point of the subject on the bed and the positions of various portions of the subject relative to the specific point of the subject), or the like, or any combination thereof. In some embodiments, the location information may be determined based on a coordinate system centered in a rotation center of the gantry of the medical device 110. The location information may be represented by Z coordinates, which represents a distance that the bed moves into or out of the gantry of the medical device 110.

In some embodiments, the processing device 120 may retrieve, from the first image set and the second image set, the first image and the second image corresponding to a same region (or a same slice) of the subject, respectively. In some embodiments, the first image and the second image may be retrieved according to Z coordinates (e.g., pixel coordinates or voxel coordinates of the Z direction). For example, if pixels (or voxels) in an image of the first image set have same Z coordinates of as those in another image of the second image set, one of these two images from the first image set may be designated as the first image, and the other one from the second image set may be designated as the second image. For example, as shown in FIG. 6, the processing device 120 may obtain, from the first image set obtained in "shot n," the image 610 as the first image. The processing device 120 may obtain, from the second image set obtained in "shot n+1," the image 620 as the second image.

In some embodiments, the processing device 120 may obtain the first image (or the first image set) and/or the second image (or the second image set) from one or more components (e.g., the medical device 110, the terminal 140, and/or the storage device 130) of the image processing system 100 or an external storage device via, e.g., the network 150. For example, the medical device 110 may transmit acquired imaging data (e.g., projection data) to the storage device 130, or any other storage device for storage. The processing device 120 may obtain the imaging data from the storage device 130, or another storage device, and generate the first image (or the first image set) and/or the second image (or the second image set) based on the imaging data by image reconstruction according to an image reconstruction algorithm. Exemplary image reconstruction algorithms may include a back-projection algorithm, an iteration reconstruction algorithm, a multiplanar reconstruction (MPR) algorithm, or the like, or any combination thereof. As another example, the processing device 120 may obtain the first image (or the first image set) and/or the second image (or the second image set) from the medical device 110 directly. In some embodiments, the plurality of images of the first image set (or the second image set) may include a two-dimensional (2D) image, a three-dimensional (3D) image, a four-dimensional (4D) image (e.g., a time series of 3D images), etc.

In 530, the processing device 120 (e.g., the determining module 420) may determine a displacement vector field based on the first image and the second image.

In some embodiments, the displacement vector field may include a plurality of displacement vectors. Each displacement vector may indicate a displacement of a same physical point of the subject between two different time points. The displacement may be expressed in displacement values assessed based on two corresponding pixels (or voxels) representing the same physical point of the subject in the first image and the second image acquired at the two different time points, respectively. Each displacement value may be a distance between the two corresponding pixels (or voxels) along a direction (e.g., X axis, Y axis, Z axis shown in FIG. 1). As used herein, a distance between two pixels (or voxels) along a direction may be represented by a coordinate difference between coordinates of the two pixels (or voxels) along the direction. For example, a distance between two pixels (or voxels) along the X-direction may be represented by X1-X2, where X1 denotes an X coordinate of a first pixel (or a first voxel) in the first image and X2 denotes an X coordinate of a second pixel (or a second voxel) in the second image. The first pixel (or the first voxel) and the second pixel (or the second voxel) may be two corresponding pixels (or voxels) representing a same physical point of the subject. As another example, a distance between the first pixel (or voxel) and the second pixel (or voxel) along the Y-direction may be represented by Y1-Y2, where Y1 denotes a Y coordinate of the first pixel (or voxel) and Y2 denotes a Y coordinate of the second pixel (or voxel). As still another example, a distance between the first pixel (or voxel) and the second pixel (or voxel) along the Z-direction may be represented by Z1-Z2, where Z1 denotes a Z coordinate of the first pixel (or voxel) and Z2 denotes a Z coordinate of the second pixel (or voxel). Since pixels (or voxels) in the first image have same Z coordinates as their respective pixels (or voxels) in the second image, the distance between the first pixel (or voxel) and the second pixel (or voxel) along Z-direction may be 0.

In some embodiments, the displacement vector field may be represented as an array including a plurality of elements. Each element of the array may correspond to a pixel (or a voxel) in the first image. For example, an element of the array of the displacement vector field may include the original location of a pixel (or voxel) in the first image, displacement values along different directions of pairs of corresponding pixels (or voxels) in the first image and the second image, or the like, or a combination thereof. In some embodiments, the original location of the pixel (or voxel) may be represented as coordinates (e.g., X coordinates, Y coordinates, Z coordinates). For example, if the first image and the second image are 2D images, the displacement vector field may be a 2D displacement vector field. An element of the array of the displacement vector field corresponding to pixel pub of the first image may include $[w_{ij}, h_{ij}, x_{ij}, y_{ij}]$, where $w_{ij}$ denotes an original location of pixel Pu of the first image along a first direction (e.g., X axis), $h_{ij}$ denotes an original location of pixel pub of the first image along a second direction (e.g., Y axis), $x_{ij}$ denotes a displacement value from pixel Pu of the first image to its corresponding pixel of the second image along the first direction (e.g., X axis), and $y_{ij}$ denotes a displacement value from pixel pub of the first image to its corresponding pixel of the second image along the second direction (e.g., Y axis). As another example, if the first image and the second image are 3D images, the displacement vector field may be a 3D displacement vector field. An element corresponding to voxel $p_{lmn}$ of the first image may include $[w_{lmn}, h_{lmn}, d_{him}, x_{lmn}, y_{lmn}, z_{lmn}]$, where whim denotes an original location of voxel $p_{lmn}$ of the first image along a first direction (e.g., X axis), $h_{lmn}$ denotes an original location of voxel $p_{lmn}$ of the first image along a second direction (e.g., Y axis), $d_{lmn}$ denotes an original location of voxel $p_{lmn}$ of the first image along a third direction (e.g., Z axis), $x_{lmn}$ denotes a displacement value from voxel $p_{lmn}$ of the first image to its corresponding voxel of the second image along the first direction (e.g., X axis), $y_{lmn}$ denotes a displacement value from voxel $p_{lmn}$ of the first image to its corresponding voxel of the second image along the second direction (e.g., Y axis), and $z_{lmn}$ denotes a displacement value from voxel $p_{lmn}$ of the first image to its corresponding voxel of the second image along the third direction (e.g., Z axis). Since voxels in the first image have same Z coordinates as those in the second image, the displacement value $z_{lmn}$ may be 0. In some embodiments, an element of the array of the displacement vector field may only include displacement values along different directions of pairs of corresponding pixels (or voxels) in the first image and the second image, and the elements may be arranged in the displacement vector field according to the arrangements of their corresponding pixels (or voxels) in the first image and/or the second image. For example, an element corresponding to pixel $p_{ij}$ of the first image may include $[x_{ij}, y_{ij}]$ and arranged as $element_{ij}$ in the displacement vector field at the same position as pixel $p_{ij}$ in the first image or the image data from which the first image is generated. As another example, an element corresponding to voxel $p_{lmn}$ of the first image may include $[x_{lmn}, y_{lmn}, z_{lmn}]$ and arranged as $element_{lmn}$ in the displacement vector field at the same position as pixel $p_{lmn}$ in the first image or the image data from which the first image is generated.

In some embodiments, the processing device 120 may register the first image and the second image to obtain the displacement vector field. As used herein, image registration refers to a process of transforming the spatial information of different images into a same coordinate system in order to compare, integrate, etc., the data obtained from the different images. In some embodiments, the first image may be regarded as a reference image, and the processing device 120 may perform a transformation operation on the second image to determine the displacement vector field. Alternatively, the second image may be regarded as a reference image, and the processing device 120 may perform a transformation operation on the first image to generate the displacement vector field.

In some embodiments, the processing device 120 may register the first image and the second image according to one or more image registration algorithms. In some embodiments, the image registration algorithms may include a deformable registration. Exemplary deformable image registration algorithms may include a Demons algorithm, an intensity-based algorithm, a feature-based algorithm, a transformation model algorithm (e.g., a non-rigid transformation model), a spatial domain algorithm, a frequency domain algorithm, a single-modality algorithm, an automatic algorithm, and an interactive algorithm, or the like, or any combination thereof. For example, the processing device 120 may register the first image and the second image based on the Demons algorithm according to Equation (1):

$$S=(M-F)\times\left(\rightarrow\frac{\vec{\nabla}F}{\left|\vec{\nabla}F\right|^2+(F-M)^2}+\frac{\vec{\nabla}M}{\left|\vec{\nabla}M\right|^2+(F-M)^2}\right),\qquad(1)$$

where S denotes the displacement vector field, M denotes index information (including location information and values (e.g., pixel values or voxel values)) of pixels (or voxels) of the second image, F denotes index information of pixels (or voxels) of the first image, $\vec{\nabla}F$ denotes a gradient of the first image, which indicates relationships (e.g., differences of two adjacent pixels (or voxels) along different directions) between two adjacent pixels (or voxels) of the first image, and $\vec{\nabla}M$ denotes a gradient of the second image, which indicates relationships (e.g., differences of two adjacent pixels (or voxels) along different directions) between two adjacent pixels (or voxels) of the second image. As used herein, a pixel value of a pixel (or a voxel value of a voxel) may represent a characteristic of the pixel (or the voxel). Exemplary characteristics of a pixel (or voxel) may include a luminance value, a gray value, color, an RGB value, a saturation value, or the like, or any combination thereof.

In 540, the processing device 120 (e.g., the generating module 430) may generate a target image based on the displacement vector field, the first image set and the second image set.

In some embodiments, the processing device 120 may process the first image set based on the displacement vector field to obtain the processed first image set and/or process the second image set based on the displacement vector field to obtain the processed second image set. As used herein, processing an image set may indicate processing one or more images of the image set. For example, the processing device 120 may process only one original image of the first image set and replace the original image with the processed image in the first image to obtain the processed first image set. As another example, the processing device 120 may process each image of the first image set to obtain the processed first image set. In some embodiments, the processing device 120 may add the displacement vector field (or a weighted displacement vector field that is determined based on the displacement vector field and a weighting factor (e.g., ½, −½, etc.,)) to the first image and/or the second image. In some embodiments, the weighting factor may relate to a distance between an image and the first image (or the second image)). As used herein, a distance between two images may indicate a distance between the two images along the direction (e.g., z direction) in which the bed moves into or out of the gantry of the medical device 110. In some embodiments, the distance between two images may be determined based on Z coordinates of pixels (or voxels) in each image of the two images. For example, the distance between two images may be a difference in Z coordinates of pixels (or voxels) in each image of the two images. More descriptions regarding obtaining the processed first image set and/or the processed second image set may be found elsewhere in the present disclosure. See, e.g., FIGS. 7-9 and the descriptions thereof.

In some embodiments, the processing device 120 may obtain a target image sequence based on at least one of the processed first image set or the processed second image set, and generate the target image based on the target image sequence. The target image sequence may include a plurality of images (or image data from which the plurality of images are generated by way of, e.g., image reconstruction). In some embodiments, the processing device 120 may obtain an initial image sequence. For example, the initial image sequence may include images of the processed first image set and the second image set in chronological order or in spatial order. As another example, the initial image sequence may include the first image set and the processed second image set in chronological order or in spatial order. As still another example, the initial image sequence may include the processed first image set and the processed second image set in chronological order or in spatial order. In some embodiments, the chronological order may be obtained by ranking images according to time points at which raw data of the images (or the processed images) were obtained, respectively. In some embodiments, the spatial order may be obtained by ranking images according to the positions of regions or slices of the subject which are represented in the images, respectively. For example, the images of the processed first image set and the second image set may be ranked based on the positions of the regions or slices from the head of a patient (i.e., the subject) to his/her feet.

In some embodiments, the processing device 120 may process the initial image sequence to obtain the target image sequence. For example, the processing device 120 may delete, from the initial image sequence, one of two images corresponding to a same second region (or at least a slice in the second region) to obtain the target image sequence. As another example, the processing device 120 may determine a fused image by fusing the two images corresponding to the second region (or at least a slice of the second region), and replace the two images with the fused image to obtain the target image sequence. In some embodiments, the second region may be same as or different from the overlapping region described in operation 520. More descriptions regarding the determination of the target image sequence may be found elsewhere in the present disclosure. See, e.g., FIGS. 7 and 11-13 and the description thereof. More descriptions regarding the determination of the fused image may be found elsewhere in the present disclosure. See, e.g., FIG. 13 and the description thereof.

In some embodiments, the processing device 120 may generate the target image based on the target image sequence. In some embodiments, the target image may include one or more images of the target image sequence or one or more images reconstructed from the image data of the target image sequence. For example, the processing device 120 may determine the target image using the image data of the target image sequence according to a reconstruction algorithm. Exemplary reconstruction algorithms may include an iterative reconstruction algorithm (e.g., a statistical reconstruction algorithm), a Fourier slice theorem algorithm, a filtered back projection (FBP) algorithm, an analytic reconstruction algorithm, or the like, or any combination thereof. In some embodiments, the one or more images of the target image sequence may be selected based on a region of interest (ROI) of the subject. In some embodiments, the ROI may be determined by a user (e.g., a doctor or an imaging technician) and sent to the processing device 120. The processing device 120 may obtain the ROI through an I/O device (e.g., I/O 230, I/O 350), and select one or more images of the ROI from the target image sequence.

According to using the displacement vector field to register the original image sets and further to generate the target image, artifact (e.g., a stagger) in the target image caused by, e.g., the misalignment of the first image and the second image, may be improved, thereby improving the efficiency and/or accuracy of diagnosis and/or treatment performed based thereon. Exemplary comparison diagrams between an original image and its target image processed by using the displacement vector field according to some embodiments of the present disclosure may be found elsewhere in the present disclosure. See, e.g., FIGS. 15A and 15B, and/or FIGS. 16A and 16B.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, each of the first image set and the second image set may include at least two 2D images corresponding to a same region, or referred to as an overlapping region (or at least a slice in the overlapping region) of the subject. The at least two 2D images in the first image set may be reconstructed as a first 3D image and the at least two 2D images in the second image set may be reconstructed as a second 3D image. The first 3D image and the second 3D image may correspond to a same region, or referred to as an overlapping region (or multiple slices in the overlapping region) of the subject. The processing device 120 may determine a displacement vector field based on the first 3D image and the second 3D image according to operation 530, and generate a target image according to operation 540.

Figure 7:
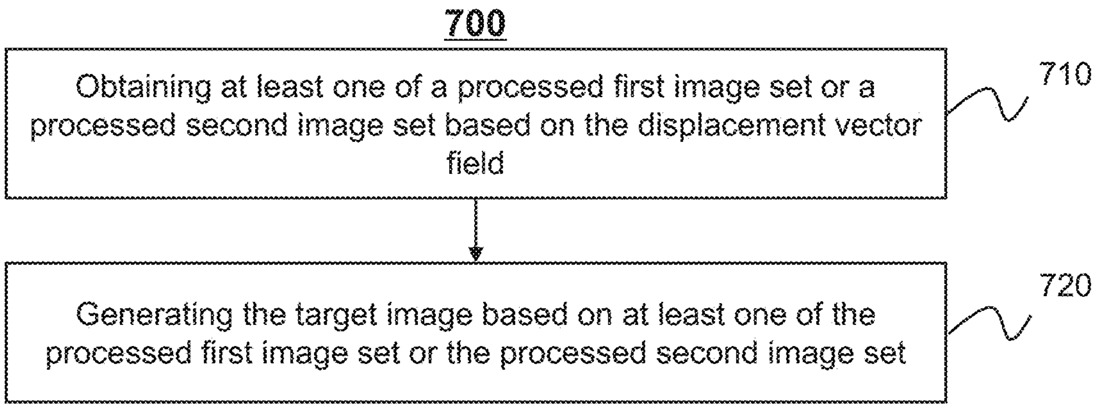
FIG. 7 is a flowchart illustrating an exemplary process for generating target image according to some embodiments of the present disclosure.

FIG. 7 is a flowchart illustrating an exemplary process 700 for generating a target image according to some embodiments of the present disclosure. In some embodiments, the process 700 may be implemented in the image processing system 100 illustrated in FIG. 1. For example, the process 700 may be stored in the storage device 130 and/or the storage (e.g., the storage 220, the storage 390) as a form of instructions, and invoked and/or executed by the processing device 120 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting. In some embodiments, operation 540 may be performed according to process 700.

In 710, the processing device 120 (e.g., the generating module 430) may obtain at least one of a processed first image set or a processed second image set based on the displacement vector field.

In some embodiments, the processing device 120 may process only the first image set based on the displacement vector field to obtain the processed first image set. Alternatively, the processing device 120 may process only the second image set based on the displacement vector field to obtain the processed second image set. Alternatively, the processing device 120 may process both the first image set and the second image set based on the displacement vector field to obtain the processed first image set and the processed second image set, respectively.

In some embodiments, the processing device 120 may process only one image of the first image set (or the second image set) to obtain the processed first image set (or the processed second image set). For example, the processing device 120 may process the first image based on the displacement vector field to obtain a processed first image, and replace the first image with the processed first image to obtain the processed first image set. As described elsewhere in the present disclosure, the first image may be 2D or 3D. See, e.g., relevant descriptions with reference to FIG. 5. As another example, the processing device 120 may process the second image based on the displacement vector field to obtain a processed second image, and replace the second image with the processed second image to obtain the processed second image set. As described elsewhere in the present disclosure, the second image may be 2D or 3D. See, e.g., relevant descriptions with reference to FIG. 5. In some embodiments, the processing device 120 may process the first image and/or the second image based on the displacement vector field by adding the displacement vector field (or a weighted displacement vector field that is determined based on the displacement vector field and a weighting factor (e.g., ½, −½, etc.,)) to the first image and/or the second image. For example, the processing device 120 may add −S (where S denotes the displacement vector field determined according to, e.g., Equation (1) described in FIG. 5) to the first image to obtain the processed first image. As another example, the processing device 120 may add +S to the second image to obtain the processed second image. As still another example, the processing device 120 may add −S/2 to the first image to obtain the processed first image and add +S/2 to the second image to obtain the processed second image, respectively. As used here, adding a vector field (e.g., +S, −S) to an image indicates that the image moves by a distance that is determined by the displacement vector field towards a direction. The vector field +S and the vector field −S are in two opposite directions, respectively. As used herein, an image being moved by a distance in a direction indicates that the subject (or a portion thereof) represented in the image is moved by the distance in the direction. For example, adding −S to the first image indicates that the first image moves by a distance determined by S towards a directions determined by S (e.g., a direction of a composition of the components of S on the three axes). Adding +S to the second image indicates that the second image moves by a distance determined by S towards a directions determined by S (e.g., a direction of a composition of the components of S on the three axes).

In some embodiments, the processing device 120 may process more than one images of the first image set (or the second image set) to obtain the processed first image set (or the processed second image set). For example, the processing device 120 may process the first image and/or the second image, and further process one or more images other than the first image of the first image set (or other than the second image of the second image set) based on the displacement vector field. More descriptions regarding obtaining a processed image set (e.g., the processed first image and/or the processed second image) may be found elsewhere in the present disclosure. See, e.g., FIGS. 8-10 and the descriptions thereof.

In 720, the processing device 120 (e.g., the generating module 430) may generate the target image based on at least one of the processed first image set or the processed second image set.

In some embodiments, the processing device 120 may generate the target image based on the processed first image set and the second image set. For example, the processing device 120 may determine a target image sequence based on the processed first image set and the second image set, and determine the target image based on the target image sequence. In some embodiments, the processing device 120 generate the target image based on the first image set and the processed second image set. For example, the processing device 120 may determine a target image sequence based on the first image set and the processed second image set. In some embodiments, the processing device 120 generate the target image based on the processed first image set and the processed second image set. For example, the processing device 120 may determine a target image sequence based on the processed first image set and the processed second image set. More descriptions regarding obtaining a target image sequence and/or determining a target image may be found elsewhere in the present disclosure. See, e.g., FIGS. 11-12 and the descriptions thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 8:
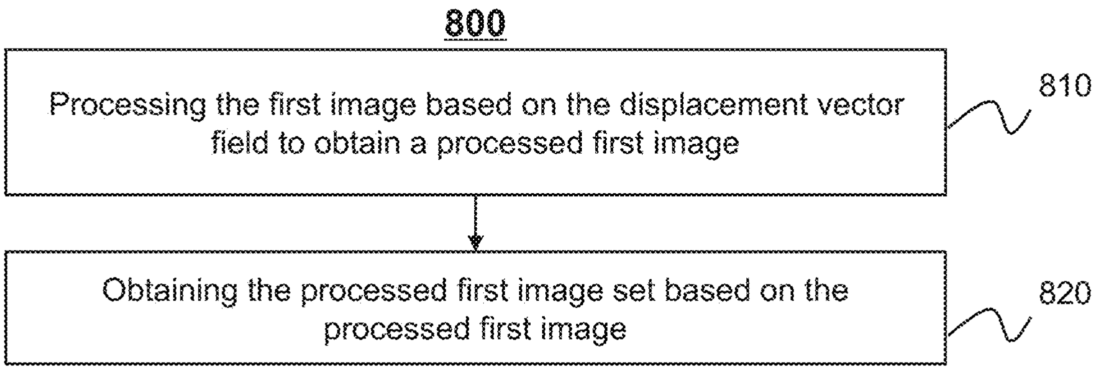
FIG. 8 is a flowchart illustrating an exemplary process for obtaining a processed first image set according to some embodiments of the present disclosure.

FIG. 8 is a flowchart illustrating an exemplary process 800 for obtaining a processed first image set according to some embodiments of the present disclosure. In some embodiments, the process 800 may be implemented in the image processing system 100 illustrated in FIG. 1. For example, the process 800 may be stored in the storage device 130 and/or the storage (e.g., the storage 220, the storage 390)

as a form of instructions, and invoked and/or executed by the processing device 120 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting. In some embodiments, operation 710 may be performed according to process 800.

In 810, the processing device 120 (e.g., the generating module 430) may process the first image based on the displacement vector field to obtain a processed first image.

In some embodiments, the processing device 120 may process the first image based on the displacement vector field. For instance, the processing device 120 may process the first image by adding the displacement vector field) to the first image. Merely by way of example, the processing device 120 may add −S (where S denotes the displacement vector field determined according to, e.g., Equation (1) described in connection with FIG. 5) to the first image to obtain the processed first image. As another example, the processing device 120 may process the first image by adding a weighted displacement vector field to the first image. The weighting factor may be a predetermined value or determined based on a distance between an image and the first image. Merely by way of example, the processing device 120 may add −S/2 to the first image to obtain the processed first image.

In 820, the processing device 120 (e.g., the generating module 430) may obtain the processed first image set based on the processed first image.

In some embodiments, the processing device 120 may replace the first image with the processed first image in the first image set to obtain the processed first image set. In some embodiments, the processing device 120 may further process one or more images other than the first image to obtain the processed first image set. More descriptions regarding obtaining a processed first image set based on the processed first image and one or more images other than the first image may be found elsewhere in the present disclosure. See, e.g., FIG. 9 and the descriptions thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 120 may obtain a processed second image set according to process 800 in a similar way. In some embodiments, a sign of a weighting factor (or a second fusion weighting factoring factor) that is used for determining a weighted displacement vector field (or a second fusion weighting factored displacement vector field) of a second image of the second image set may be opposite to a weighting factor (or a first fusion weighting factoring factor) of the first image of the first image set. Two opposite signs of the weighting factors may indicate that the first image and the second image are processed by moving the first image and the second image towards two opposite directions, respectively. For example, the first fusion weighting factoring factor of the first image may be −½, and the second fusion weighting factor of the second image may be ½ such that the weighted displacement vector field (or a first fusion weighting factored displacement vector field) of the first image may be −S/2, and the second fusion weighting factored displacement vector field of the second image may be +S/2.

Figure 9:
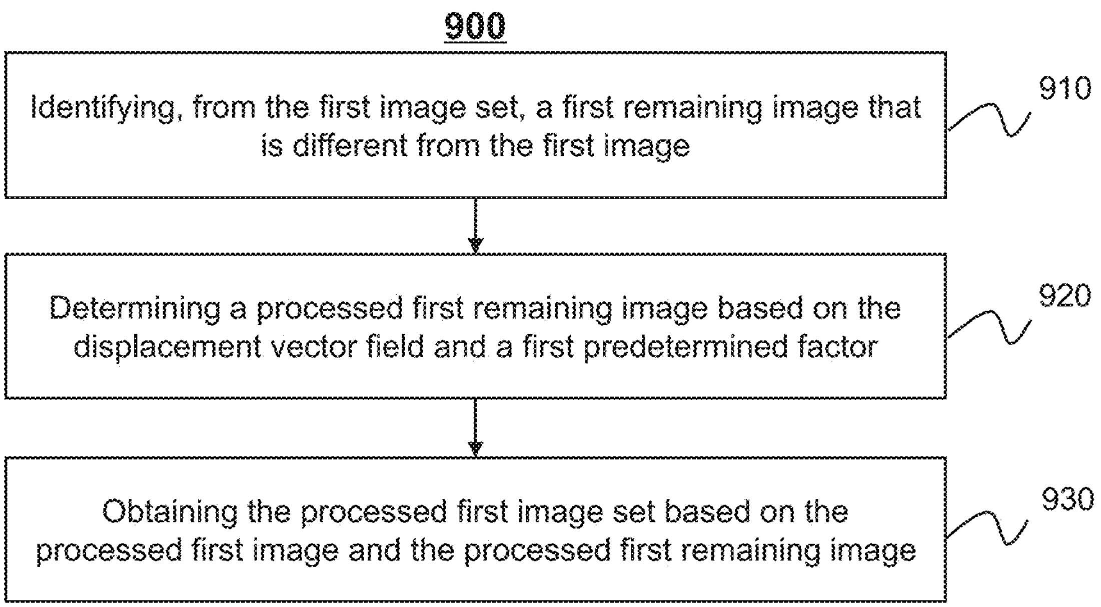
FIG. 9 is a flowchart illustrating an exemplary process for obtaining a processed first image set according to some embodiments of the present disclosure.

FIG. 9 is a flowchart illustrating an exemplary process 900 for obtaining a processed first image set according to some embodiments of the present disclosure. In some embodiments, the process 900 may be implemented in the image processing system 100 illustrated in FIG. 1. For example, the process 900 may be stored in the storage device 130 and/or the storage (e.g., the storage 220, the storage 390) as a form of instructions, and invoked and/or executed by the processing device 120 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 900 may be accomplished with one or more additional operations not described, and/or without one or more of the operations discussed. Additionally, the order in which the operations of the process 800 as illustrated in FIG. 9 and described below is not intended to be limiting. In some embodiments, operation 820 may be performed according to process 900.

In 910, the processing device 120 (e.g., the generating module 430) may identify, from the first image set, a first remaining image that is different from the first image.

FIG. 10 is a schematic diagram illustrating an exemplary first image set and an exemplary second image set according to some embodiments of the present disclosure. As shown in FIG. 10 that is in connection with FIG. 6, the first image 610 of the first image set obtained in "shot n" and the second image 620 of the second image set obtained in "shot n+1" may correspond to a same (or overlapping) region (or at least a slice in the overlapping region) of the subject. In some embodiments, the processing device 120 may identify, from the first image set obtained in "shot n," an image other than the first image 610 as the first remaining image. As shown in FIG. 10, an image 630 (or an image 640) may be identified as the first remaining image. The "−f*S" and "f*S" are described elsewhere in the present disclosure. See, e.g., relevant description in connection with 920.

In 920, the processing device 120 (e.g., the generating module 430) may determine a processed first remaining image based on the displacement vector field and a first fusion weighting factoring factor.

In some embodiments, the processing device 120 may process the first remaining image by adding a product of the first predetermined factor and the displacement vector field to the first remaining image. For example, the processing device 120 may add −f*S (where S denotes the displacement vector field determined according to, e.g., Equation (1) described in FIG. 5, and −f denotes the first weighting factor) to the first remaining image to obtain the processed first remaining image. In some embodiments, the first weighting factor may be a value indicating an extent to which the displacement vector field affects the first remaining image. In some embodiments, the first fusion weighting factoring factor may be associated with a distance between the first image and the first remaining image. As used herein, a distance between two images of subject (e.g., between the first image and the first remaining image) indicates a distance between the two regions (or slices) of the subject represented in the two images, respectively. For example, the greater the distance between the first image and the first remaining image in the first image set, the smaller the first fusion weighting factoring factor may be. As illustrated in FIG. 10, a distance between the first image 610 and the first remaining image 630 is less than a distance between the first image 610 and the first remaining image 640. The first fusion weighting factoring factor of the first remaining image 630 may be greater than the first fusion weighting factoring factor of the first remaining image 640. Merely by way of example, the first fusion weighting factoring factor of the first remaining image 630 may be −0.3, and the first fusion weighting factoring factor of the first remaining image 640 may be −0.5. As another example, the greater the distance between the second image and the second remaining image in the second image set, the greater the first fusion weighting factoring factor may be. As illustrated in FIG. 10, a distance between the second image 620 and a second remaining image 630' is less than a distance between the second image 620 and the second remaining image 640'. The second fusion weighting factoring factor of the second remaining image 630' may be less than the first fusion weighting factoring factor of the second remaining image 640'. Merely by way of example, the second fusion weighting factoring factor of the second remaining image 630' may be 0.3, and the second fusion weighting factoring factor of the second remaining image 640' may be 0.5. In some embodiments, the first fusion weighting factoring factor may be determined based on the distance between the first image and a first remaining image and a distance threshold. For example, if the distance between the first image and a first remaining image is greater than the distance threshold, the first fusion weighting factoring factor may be 0, which indicates that the displacement vector field does not affect the first remaining image. For example, if the distance threshold is a distance between two neighboring images of the first image set, as shown in FIG. 10, the distance between the first image 610 and the first remaining image 640 is greater than the distance between two neighboring images, and the first fusion weighting factoring factor of the first remaining image 640 may be 0. In this exemplary case, the displacement vector field affects only the first remaining image that is right next to the first image. As used herein, two images of a same image set that include representations of regions A and B (or slices A and B) of a subject, respectively, are considered neighboring to each other if there is no other image of the image set that includes a representation of a region (or slice) between regions A and B (or slices A and B) of the subject.

In 930, the processing device 120 (e.g., the generating module 430) may obtain the processed first image set based on the processed first image and the processed first remaining image.

In some embodiments, the processing device 120 may replace the first image with the processed first image and replace the first remaining image with the processed first remaining image in the first image set to obtain the processed first image set.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 120 may process two or more first remaining images that are different from the first image, and replace each of the two or more first remaining images with the corresponding processed first remaining images, respectively, to obtain the processed first image set. As another example, the processing device 120 may obtain the second processed image set according to process 900 in a similar way.

FIG. 11 is a flowchart illustrating an exemplary process 1100 for generating a target image according to some embodiments of the present disclosure. In some embodiments, the process 1100 may be implemented in the image processing system 100 illustrated in FIG. 1. For example, the process 1100 may be stored in the storage device 130 and/or the storage (e.g., the storage 220, the storage 390) as a form of instructions, and invoked and/or executed by the processing device 120 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 1100 may be accomplished with one or more additional operations not described, and/or without one or more of the operations discussed. Additionally, the order in which the operations of the process 1100 as illustrated in FIG. 11 and described below is not intended to be limiting. In some embodiments, operation 720 may be performed according to process 1100.

In 1110, the processing device 120 (e.g., the generating module 430) may obtain a target image sequence based on at least one of the processed first image set or the processed second image set.

In some embodiments, the processing device 120 may obtain the target image sequence based on the first image set and the processed second image set. In some embodiments, the processing device 120 may obtain the target image sequence based on the processed first image set and the second image set. In some embodiments, the processing device 120 may obtain the target image sequence based on the processed first image set and the processed second image set. In some embodiments, the processing device 120 may obtain an initial image sequence. For example, the initial image sequence may include images of the processed first image set and the second image set in chronological order. As another example, the initial image sequence may include the first image set and the processed second image set in chronological order. As still another example, the initial image sequence may include the processed first image set and the processed second image set in chronological order. In some embodiments, the processing device 120 may process the initial image sequence to obtain the target image sequence.

For example, the processing device 120 may delete, from the initial image sequence, one of two images corresponding to a same second overlapping region (or at least a slice in the second overlapping region) to obtain the target image sequence. As another example, the processing device 120 may determine a fused image by fusing the two images corresponding to the second region (or at least a slice in the second region), and replace the two images with the fused image in the initial image sequence to obtain the target image sequence. In some embodiments, the second region (or at least a slice in the second region) may be the same as or different from the overlapping region (or at least a slice in the overlapping region) described in connection with operation 520 that is represented in both the first image and the second image on the basis of which the displacement vector field is determined. More descriptions regarding obtaining the target image sequence may be found elsewhere in the present disclosure. See e.g., FIGS. 12-13 and the descriptions thereof.

In 1120, the processing device 120 (e.g., the generating module 430) may generate the target image based on the target image sequence.

In some embodiments, operation 1120 may be performed in a similar manner as operation 540 as described in connection with FIG. 5, the descriptions of which are not repeated here.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 12 is a flowchart illustrating an exemplary process 1200 for determining a target image sequence according to some embodiments of the present disclosure. In some embodiments, the process 1200 may be implemented in the image processing system 100 illustrated in FIG. 1. For example, the process 1200 may be stored in the storage device 130 and/or the storage (e.g., the storage 220, the storage 390) as a form of instructions, and invoked and/or executed by the processing device 120 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 1200 may be accomplished with one or more additional operations not described, and/or without one or more of the operations discussed. Additionally, the order in which the operations of the process 1200 as illustrated in FIG. 12 and described below is not intended to be limiting. In some embodiments, operation 1110 may be performed according to process 1200.

In 1210, the processing device 120 (e.g., the generating module 430) may obtain an initial image sequence based on the first image set and the second image set. For instance, the initial image sequence may include the processed first image set and the second image set. As another example, the initial image sequence may include the first image set and the processed second image set. As a further example, the initial image sequence may include the processed first image set and the processed second image set. See, e.g., relevant description in the description of 540 of FIG. 5. Merely for illustration purposes, the process 1200 is provided below with reference to the exemplary case in which the initial image sequence including the processed first image set and the second image set.

In 1220, the processing device 120 (e.g., the generating module 430) may identify a third image from the processed first image set.

In 1230, the processing device 120 (e.g., the generating module 430) may identify a fourth image from the second image set. In some embodiments, the third image and the fourth image may correspond to a same second region (or at least a slice in the second region) of the subject. As used herein, an image corresponding to a region (or at least a slice of a region) of the subject indicates that the image includes a representation of the region (or the at least a slice of the region) of the subject.

In some embodiments, the processing device 120 may retrieve the processed first image set and the second image set to obtain the third image and the fourth image corresponding to the second region (or at least a slice in the second region) of the subject, respectively. Operations 1220-1230 may be performed in a similar manner as operations 510-520 as described in connection with FIG. 5 for obtaining two images corresponding to an overlapping region (or at least a slice in the overlapping region) of the subject, the descriptions of which are not repeated here. In some embodiments, the third image may be or may not be the processed first image corresponding to the first image used to determine the displacement vector field. The fourth image may be or may not be the second image that is used to determine the displacement vector field. The second same region (or the at least a slice in the second region) and the overlapping region (or the at least a slice in the overlapping region) corresponding to the first image and the second image described in process 500 may be the same. Alternatively, the second region (or the at least a slice in the second region) and the overlapping region (or at least a slice in the overlapping region) corresponding to the first image and the second image described in process 500 may be different.

In 1240, the processing device 120 (e.g., the generating module 430) may determine the target image sequence based on at least one of the third image or the fourth image.

In some embodiments, the processing device 120 may determine the target image sequence based on the fourth image and the initial image sequence. For example, the processing device 120 may delete the fourth image from the initial image sequence to obtain the target image sequence. In some embodiments, the processing device 120 may determine the target image sequence based on the third image and the initial image sequence. For example, the processing device 120 may delete the third image from the initial image sequence to obtain the target image sequence.

In some embodiments, the processing device 120 may determine a fused image based on the third image and the fourth image. In some embodiments, the fused image may be determined by fusing the third image and the fourth image. In some embodiments, the processing device 120 may assign different weights for the third image and the fourth image, and fuse the third image and the fourth image based on the fusion weighting factors by multiplying the third image and the fourth image with their respective fusion weighting factors. In some embodiments, the fusion weighting factor of the third image (or the fourth image) may be associated with an image quality of the third image (or the fourth image). As used herein, the image quality of an image (e.g., the third image, the fourth image) may be assessed in terms of one or more features of an image including, e.g., an image resolution, a color depth, an image accuracy, or the like, or any combination thereof. The better the image quality of an image (e.g., the third image, the fourth image), the greater the fusion weighting factor thereof may be. For example, if the image quality of the third image is better than that of the fourth image, the fusion weighting factor of the third image may be greater than that of the fourth image. For example, the fusion weighting factor of the third image is 0.6, and the fusion weighting factor of the fourth image is 0.4. In some embodiments, a fusion weighting factor of an image (e.g., the third image, the fourth image) may be a positive value equal to or less than 1. In some embodiments, a sum of the two fusion weighting factors of the third image and the fourth image may be equal to or less than 1.

In some embodiments, the processing device 120 may generate the fused image using an image fusion algorithm. As used herein, the fusion of multiple images may be performed to integrate information from the multiple images (e.g., different images) into a single image (i.e., the fused image). Exemplary image fusion algorithms may include a high pass filtering (HPF) algorithm, a wavelet transform algorithm, a principal component analysis (PCA) algorithm, a pair-wise spatial frequency matching algorithm, an IHS (intensity, hue, saturation) transform-based image fusion algorithm, a Laplacian pyramid algorithm, or the like, or any combination thereof.

In some embodiments, the processing device 120 may obtain the target image sequence based on the processed first image set, the second image set, and the fused image. For example, the processing device 120 may obtain an initial image sequence including images of the processed first image set and the second image set. The processing device 120 may replace the third image and the fourth image in the initial image sequence with the fused image to obtain the target image sequence.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operations 1220 and 1230 may be combined into one operation. As another example, the initial image sequence may include the first image set and the processed second image set, the third image may be retrieved from the first image set, and the fourth image retrieved from the processed second image set. As a further example, the initial image sequence may include the processed first image set and the processed second image set, the third image may be retrieved from the processed first image set, and the fourth image retrieved from the processed second image set. As still a further example, the third image may be the first image used to determine the displacement vector field, or the processed first image. As a still further example, the fourth image may be the second image used to determine the displacement vector field, or the processed second image. As a still further example, the third image may be generated based on an image of the first image set, e.g., the third image may be referred to as a fifth image of the processed first image set. The fourth image may be generated based on an image of the second image set, e.g., the fourth image may be referred to as a sixth image of the processed second image set.

Figure 13:
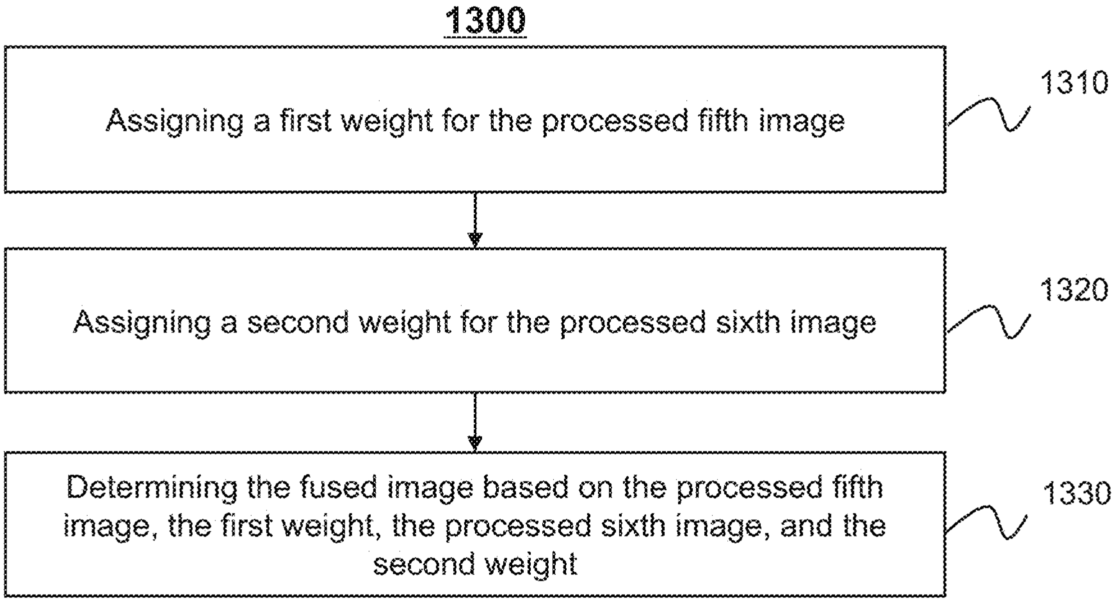
FIG. 13 is a flowchart illustrating an exemplary process for determining a fused image according to some embodiments of the present disclosure.

FIG. 13 is a flowchart illustrating an exemplary process 1300 for determining a fused image according to some embodiments of the present disclosure. In some embodiments, the process 1300 may be implemented in the image processing system 100 illustrated in FIG. 1. For example, the process 1300 may be stored in the storage device 130 and/or the storage (e.g., the storage 220, the storage 390) as a form of instructions, and invoked and/or executed by the processing device 120 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 1300 may be accomplished with one or more additional operations not described, and/or without one or more of the operations discussed. Additionally, the order in which the operations of the process 1300 as illustrated in FIG. 13 and described below is not intended to be limiting.

In 1310, the processing device 120 (e.g., the generating module 430) may assign a first fusion weighting factor for the fifth image.

In 1320, the processing device 120 (e.g., the generating module 430) may assign a second fusion weighting factor for the sixth image. In some embodiments, the fifth image may be retrieved from the first image set, and the sixth image may be retrieved from the processed second image set. In some embodiments, the fifth image may be retrieved from the processed first image set, and the sixth image may be retrieved from the processed second image set. In some embodiments, the fifth image may be the first image used to determine the displacement vector field, or the processed first image. As a still further example, the sixth image may be the second image used to determine the displacement vector field, or the processed second image. In some embodiments, the fifth image may be generated based on an image of the first image set, e.g., the fifth image may be referred to as a processed first image or a third image of the processed first image set. The sixth image may be generated based on an image of the second image set, e.g., the sixth image may be referred to as a processed second image or a fourth image of the processed second image set.

In some embodiments, a fusion weighting factor of an image (e.g., the first fusion weighting factor of the fifth image, the second fusion weighting factor of the sixth image) may indicate an extent to which the image contributes to a fused image. In some embodiments, the first fusion weight may be associated with an image quality of the fifth image, and the second fusion weight may be associated with an image quality of the sixth image. For example, the better of the image quality of the fifth image (or the sixth image), the more contribution of the fifth image (or the sixth image) to the fused image, and the greater of the first fusion weighting factor of the fifth image (or the sixth image) may be. For example, if the image quality of the fifth image is better than that of the sixth image, the first fusion weighting factor of the fifth image may be greater than that of the sixth image. For example, the first fusion weighting factor of the fifth image is 0.7 and the second fusion weighting factor of the sixth image is 0.3. In some embodiments, a fusion weighting factor of an image may be a positive value equal to or less than 1. In some embodiments, a sum of the first fusion weighting factor and the second fusion weighting factor may be equal to or less than 1.

In 1330, the processing device 120 (e.g., the generating module 430) may determine the fused image based on the fifth image, the first fusion weighting factor, the sixth image, and the second fusion weighting factor.

In some embodiments, the processing device 120 may fuse the fifth image and the sixth image according to Equation (2):

$$FI = \sum_{i=1}^{n} \left( \frac{W_i}{\sum_{i=1}^{n} W_i} I_i \right), \tag{2}$$

where FI denotes the fused image, $W_i$ denotes a weight of an image (e.g., the first fusion weighting factor of the fifth image, the second fusion weighting factor of the sixth image), $I_i$ denotes an image (e.g., the fifth image, the sixth image), and n is a positive integer greater than 1.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operations 1310 and 1320 may be combined into one operation.

Figure 14A:
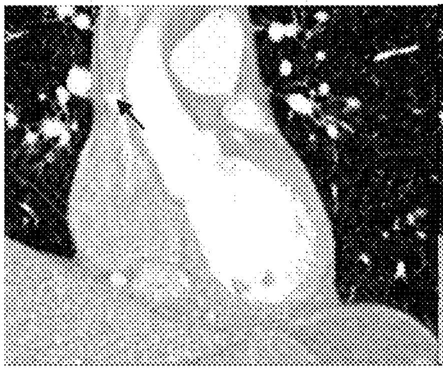
FIG. 14A is an exemplary original image of a subject according to some embodiments of the present disclosure.

FIG. 14A is an exemplary original image of a subject according to some embodiments of the present disclosure.

Figure 14B:
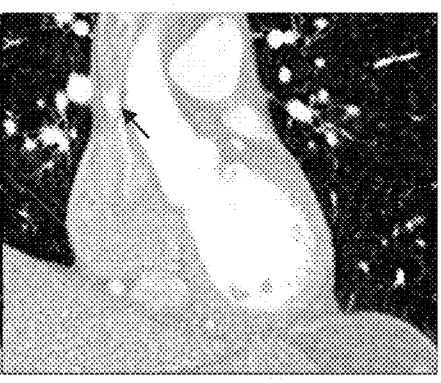
FIG. 14B is an exemplary target image of the original image of FIG. 15A according to some embodiments of the present disclosure.

FIG. 14B is an exemplary target image generated based on the original image of FIG. 14A according to some embodiments of the present disclosure. As shown in FIG. 14B, compared with FIG. 14A, artifacts (point out with arrows) in the target image which was processed using the displacement vector field were significantly reduced.

Figure 15A:
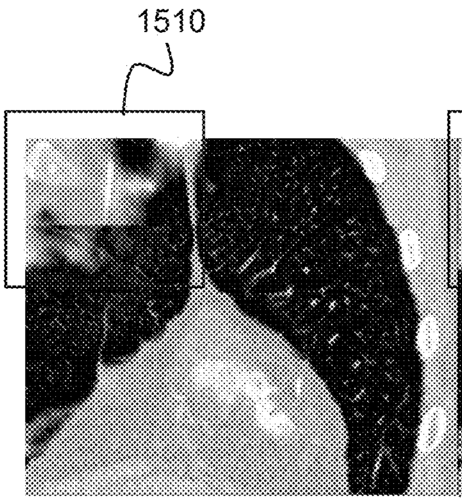
FIG. 15A is an exemplary original image according to some embodiments of the present disclosure.
Figure 15B:
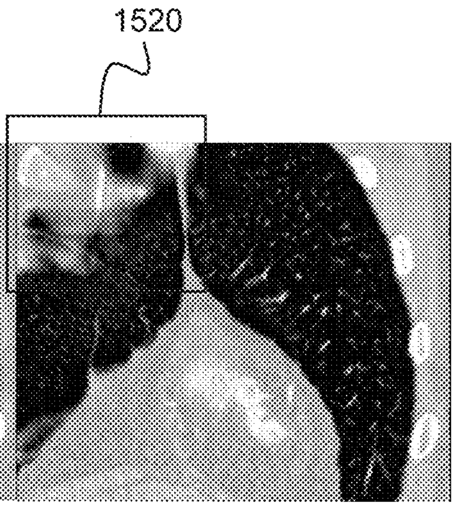
FIG. 15B is an exemplary target image of the original image of FIG. 16A according to some embodiments of the present disclosure.

FIG. 15A is an exemplary original image according to some embodiments of the present disclosure. FIG. 15B is an exemplary target image generated based on the original image of FIG. 15A according to some embodiments of the present disclosure. As shown in FIG. 15B, compared with FIG. 15A, artifacts (shown in rectangular boxes 1510 and 1520) in the target image which was processed using the displacement vector field were significantly reduced.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A system for image processing, comprising:

at least one storage device including a set of instructions; and at least one processor in communication with the at least one storage device, wherein when executing the set of instructions, the at least one processor is directed to cause the system to perform operations including:

obtaining, from a first image set of a subject acquired at a first time point, a first image;

obtaining, from a second image set of the subject acquired at a second time point, a second image, wherein the first image and the second image correspond to a same region of the subject;

determining a displacement vector field based on the first image and the second image; and generating a target image based on the displacement vector field, the first image set and the second image set;

wherein the generating a target image based on the displacement vector field, the first image set and the second image set includes:

obtaining at least one of a processed first image set or a processed second image set based on the displacement vector field;

generating the target image based on at least one of the processed first image set or the processed second image set;

wherein the obtaining at least one of a processed first image set or a processed second image set based on the displacement vector field includes:

processing the first image based on the displacement vector field to obtain a processed first image;

obtaining the processed first image set based on the processed first image;

wherein the obtaining the processed first image set based on the processed first image includes:

identifying, from the first image set, a first remaining image that is different from the first image;

determining a processed first remaining image based on the displacement vector field and a first weighting factor; and obtaining the processed first image set based on the processed first image and the processed first remaining image.

2. The system of claim 1, wherein the determining a displacement vector field includes:

registering the first image and the second image to obtain the displacement vector field.

3. The system of claim 1, wherein the first weighting factor is associated with a distance between the first image and the first remaining image.

4. The system of claim 1, wherein the generating the target image based on at least one of the processed first image set or the processed second image set includes:

obtaining a target image sequence based on at least one of the processed first image set or the processed second image set; and generating the target image based on the target image sequence.

5. The system of claim 4, wherein the obtaining a target image sequence based on at least one of the processed first image set or the processed second image set includes:

identifying a third image from the processed first image set;

identifying a fourth image from the second image set, wherein the third image and the fourth image correspond to a same second region of the subject; and determining the target image sequence based on at least one of the third image or the fourth image.

6. The system of claim 5, wherein the determining the target image sequence based on at least one of the third image or the fourth image includes:

obtaining an initial image sequence including the processed first image set and the second image set; and deleting the fourth image from the initial image sequence to obtain the target image sequence.

7. The system of claim 5, wherein the determining the target image sequence based on at least one of the third image or the fourth image includes:

determining a fused image based on the third image and the fourth image; and obtaining the target image sequence based on the processed first image set, the second image set, and the fused image.

8. The system of claim 4, wherein the obtaining a target image sequence based on at least one of the processed first image set or the processed second image set includes:

identifying a fifth image from the processed first image set;

identifying a sixth image from the processed second image set, wherein the fifth image and the sixth image correspond to a same third region of the subject; and determining the target image sequence based on at least one of the fifth image or the sixth image.

9. The system of claim 8, wherein the determining the target image sequence based on at least one of the fifth image or the sixth image includes:

obtaining an initial image sequence including the processed first image set and the processed second image set; and deleting the fifth image or the sixth image from the initial image sequence to obtain the target image sequence.

10. The system of claim 1, wherein the first image set and the second image set are obtained according to an image reconstruction algorithm.

11. The system of claim 1, wherein the first time point immediately precedes the second time point.

12. The system of claim 1, wherein the subject is at a first bed position at the first time point, and the subject is at a second bed position at the second time point.

13. The system of claim 1, wherein the first image and the second image are 2D images and the displacement vector field is a 2D displacement vector field; or the first image and the second image are 3D images and the displacement vector field is a 3D displacement vector field.

14. A method for image processing, implemented on a system including at least one storage device including a set of instructions and at least one processor configured to communicate with the at least one storage device, the method comprising:

obtaining, from a first image set of a subject acquired at a first time point, a first image;

obtaining, from a second image set of the subject acquired at a second time point, a second image, wherein the first image and the second image correspond to a same region of the subject;

determining a displacement vector field based on the first image and the second image; and generating a target image based on the displacement vector field, the first image set and the second image set;

wherein the generating a target image based on the displacement vector field, the first image set and the second image set includes:

obtaining at least one of a processed first image set or a processed second image set based on the displacement vector field;

generating the target image based on at least one of the processed first image set or the processed second image set;

wherein the generating the target image based on at least one of the processed first image set or the processed second image set includes:

obtaining a target image sequence based on at least one of the processed first image set or the processed second image set;

generating the target image based on the target image sequence;

wherein the determining the target image sequence based on at least one of the third image or the fourth image includes:

obtaining an initial image sequence including the processed first image set and the second image set; and deleting the fourth image from the initial image sequence to obtain the target image sequence.

15. A non-transitory computer readable medium, comprising executable instructions that, when executed by at least one processor, direct the at least one processor to perform a method, the method comprising:

obtaining, from a first image set of a subject acquired at a first time point, a first image;

obtaining, from a second image set of the subject acquired at a second time point, a second image, wherein the first image and the second image correspond to a same region of the subject;

determining a displacement vector field based on the first image and the second image; and generating a target image based on the displacement vector field, the first image set and the second image set, wherein the generating a target image based on the displacement vector field, the first image set and the second image set includes:

obtaining at least one of a processed first image set or a processed second image set based on the displacement vector field;

generating the target image based on at least one of the processed first image set or the processed second image set;

wherein the obtaining at least one of a processed first image set or a processed second image set based on the displacement vector field includes:

processing the first image based on the displacement vector field to obtain a processed first image;

obtaining the processed first image set based on the processed first image;

wherein the obtaining the processed first image set based on the processed first image includes:

identifying, from the first image set, a first remaining image that is different from the first image;

determining a processed first remaining image based on the displacement vector field and a first weighting factor; and obtaining the processed first image set based on the processed first image and the processed first remaining image.

16. The system of claim 1, wherein the first image set and the second image correspond to the same region of the subject including: both the first image and the second image correspond to the overlapping region.

17. The system of claim 16, the method comprising:

generating a registered target image set, and generating a target CT image without CT misalignment based on the target image set.

* * * * *